(12) United States Patent
Kashioka

(10) Patent No.: US 8,711,414 B2
(45) Date of Patent: Apr. 29, 2014

(54) PRINT PROCESSING METHOD, PRINT RELAY SERVER, CONTROL METHOD, AND STORAGE MEDIUM TO RESERVE PRINT DATA

(75) Inventor: Atsushi Kashioka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 173 days.

(21) Appl. No.: 13/401,412

(22) Filed: Feb. 21, 2012

(65) Prior Publication Data
US 2012/0218599 A1    Aug. 30, 2012

(30) Foreign Application Priority Data

Feb. 25, 2011    (JP) ................................ 2011-040325

(51) Int. Cl.
*G06F 3/12* (2006.01)
*H04N 1/40* (2006.01)

(52) U.S. Cl.
USPC ........................................ 358/1.15; 358/1.13

(58) Field of Classification Search
USPC ............... 358/1.1, 1.9, 1.13, 1.14, 1.15, 1.16, 358/1.18, 402; 715/201, 239, 716, 780; 709/201, 203, 213, 217
See application file for complete search history.

(56) References Cited

U.S. PATENT DOCUMENTS

| | | | |
|---|---|---|---|
| 8,542,390 B2 * | 9/2013 | Takahashi et al. | 358/1.15 |
| 2003/0214665 A1 * | 11/2003 | Yamada et al. | 358/1.13 |
| 2004/0263870 A1 * | 12/2004 | Itoh et al. | 358/1.1 |
| 2006/0095500 A1 * | 5/2006 | Kato | 709/201 |
| 2008/0151289 A1 * | 6/2008 | Fukasawa | 358/1.15 |
| 2009/0323110 A1 * | 12/2009 | Shiimori et al. | 358/1.15 |

FOREIGN PATENT DOCUMENTS

JP    2000-276314 A    10/2000

* cited by examiner

*Primary Examiner* — Gabriel Garcia
(74) *Attorney, Agent, or Firm* — Canon U.S.A., Inc., IP Division

(57) ABSTRACT

When information about an image forming apparatus is registered in a print service environment, to perform reservation printing, a relay virtual printer determines whether a print job acquired from a print service is reserved, and reserves a print job as a reservation print target after a user selects a bookmarklet and issues an instruction to perform the reservation printing.

11 Claims, 23 Drawing Sheets

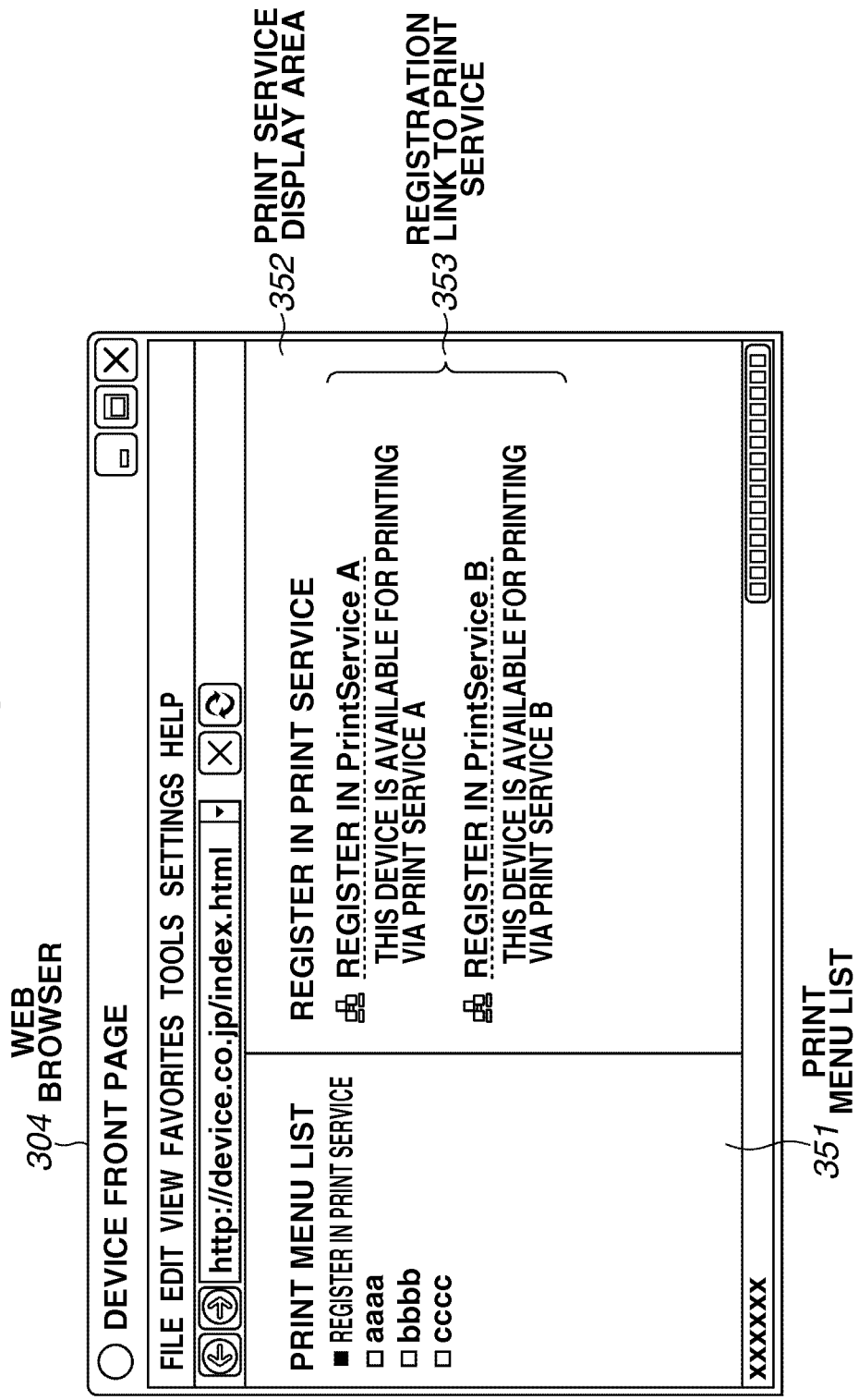

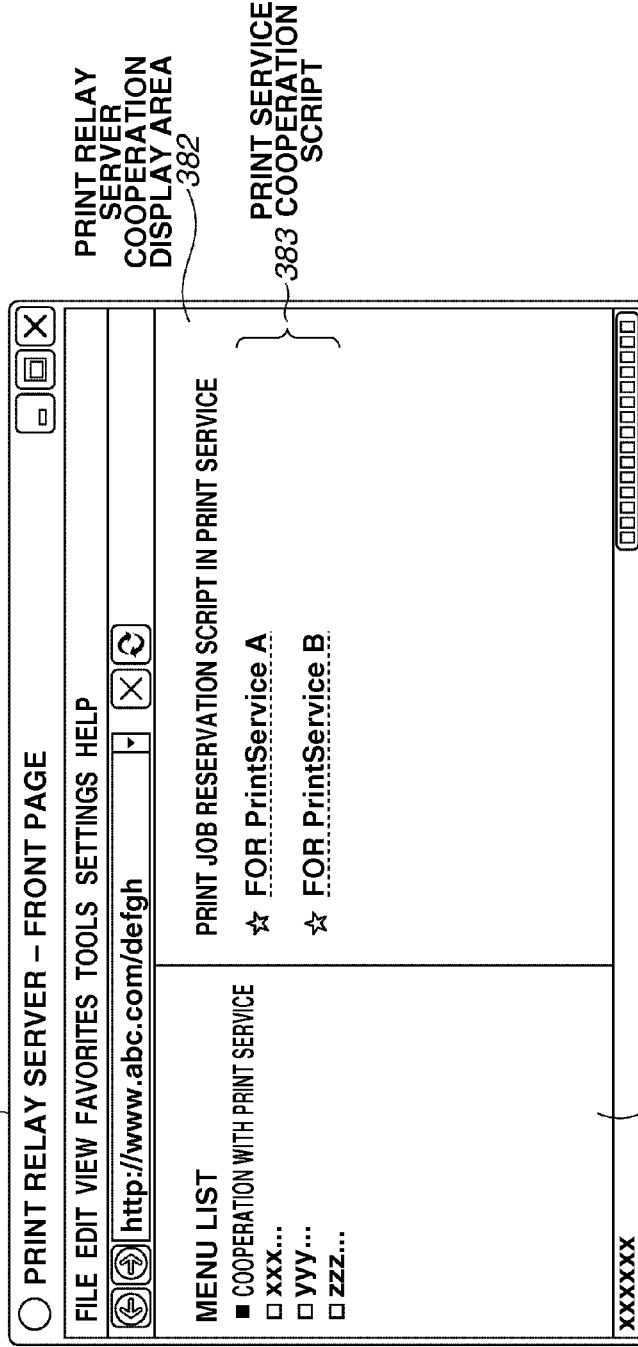

FIG.10B

```xml
<?xml version="1.0" encoding="UTF-8" ?>
<DeviceInformation>
 <Version>01.01</Version>
 <DeviceID>ABC0123456</DeviceID>
 <UserInfo>
  <UserName>UserB</UserName>
  <BaseRole>AdminilUser</BaseRole>
  ......
 </UserInfo>
 <DeviceCapabilities>
  <Capability Category="Print" Name="duplex">
   <IItem>1-Side</IItem>
   <tem>2-Side</tem>
  </Capability>
  <Capability Category="Print" Name="color_mode">
   <Item>mono</Item>
   <Item>color</Item>
  </Capability>
  <Capability Category="Print" Name="paper_size">
   <Item>B5</Item>
   <Item>A4</Item>
   <Item>A3</Item>
  </Capability>
  ......
 <DeviceCapabilities>
 ......
</DeviceInformation>
```

FIG.10C

```
<?xml version="1.0" encoding="UTF-8" ?>
<DeviceInformation>
  <Version>01.01</Version>
  <DeviceID>ABC0123456</DeviceID>
  <UserInfo>
    <UserName>UserC</UserName>
    <BaseRole>GuestUser</BaseRole>
    ......
  </UserInfo>
  <DeviceCapabilities>
    <Capability Category="Print" Name="duplex">
      <Item>2-Side</Item>
    </Capability>
    <Capability Category="Print" Name="color_mode">
      <Item>mono</Item>
    </Capability>
    <Capability Category="Print" Name="paper_size">
      <Item>B5</Item>
      <Item>A4</Item>
    </Capability>
    ......
  <DeviceCapabilities>
  ......

</DeviceInformation>
```

FIG.11A

| ID FOR IDENTIFYING IMAGE FORMING APPARATUS | INFORMATION FOR IDENTIFYING AUTHORITY | Virtual Printer ID | Service Printer ID |
|---|---|---|---|
| ABC0123456 | AdminUser | VPID0000101 | 2066904134356506708 |
| ABC0123456 | GeneralUser | VPID0000102 | 1234695692482390462 |
| DEF1357890 | GeneralUser | VPID0000201 | 4260548430266234523 |
| GHI2468012 | GuestUser | VPID0000301 | 5341397153498573493 |

FIG.11B

| INFORMATION FOR IDENTIFYING AUTHORITY | REGISTRATION STATUS IN PRINT SERVICE |
|---|---|
| AdminUser | TRUE |
| GeneralUser | TRUE |
| GuestUser | FALSE |

FIG.12A

| USER NAME OF PRINT SERVICE | LIST OF USABLE IMAGE FORMING APPARATUSES (Service Printer IDs) |
|---|---|
| P-ServiceManager | 1234695692482390462, 4260548430266234523, 2066904134356506708, 5341397153498573493 |
| P-UserA | 1234695692482390462, 4260548430266234523 |
| P-UserB | 2066904134356506708 |
| P-UserC | 5341397153498573493 |

FIG.12B

| Service Printer ID | REGISTRATION INFORMATION OF IMAGE FORMING APPARATUS |
|---|---|
| 1234695692482390462 | file://xxxxxxxxxx/1234695692482390462.xml |
| 4260548430266234523 | file://yyyyyyyyyy/4260548430266234523.xml |
| 2066904134356506708 | file://zzzzzzzzzz/2066904134356506708.xml |

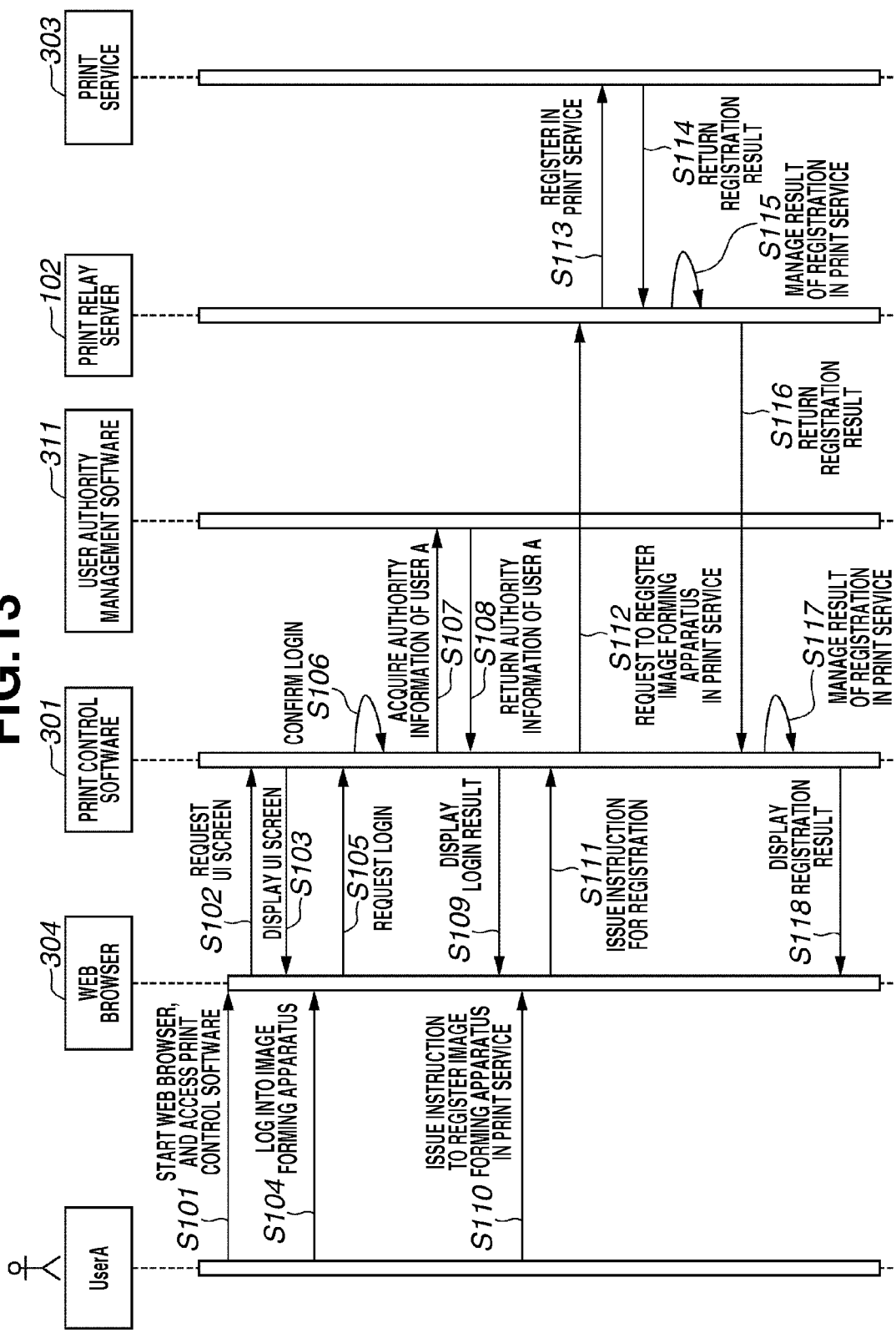

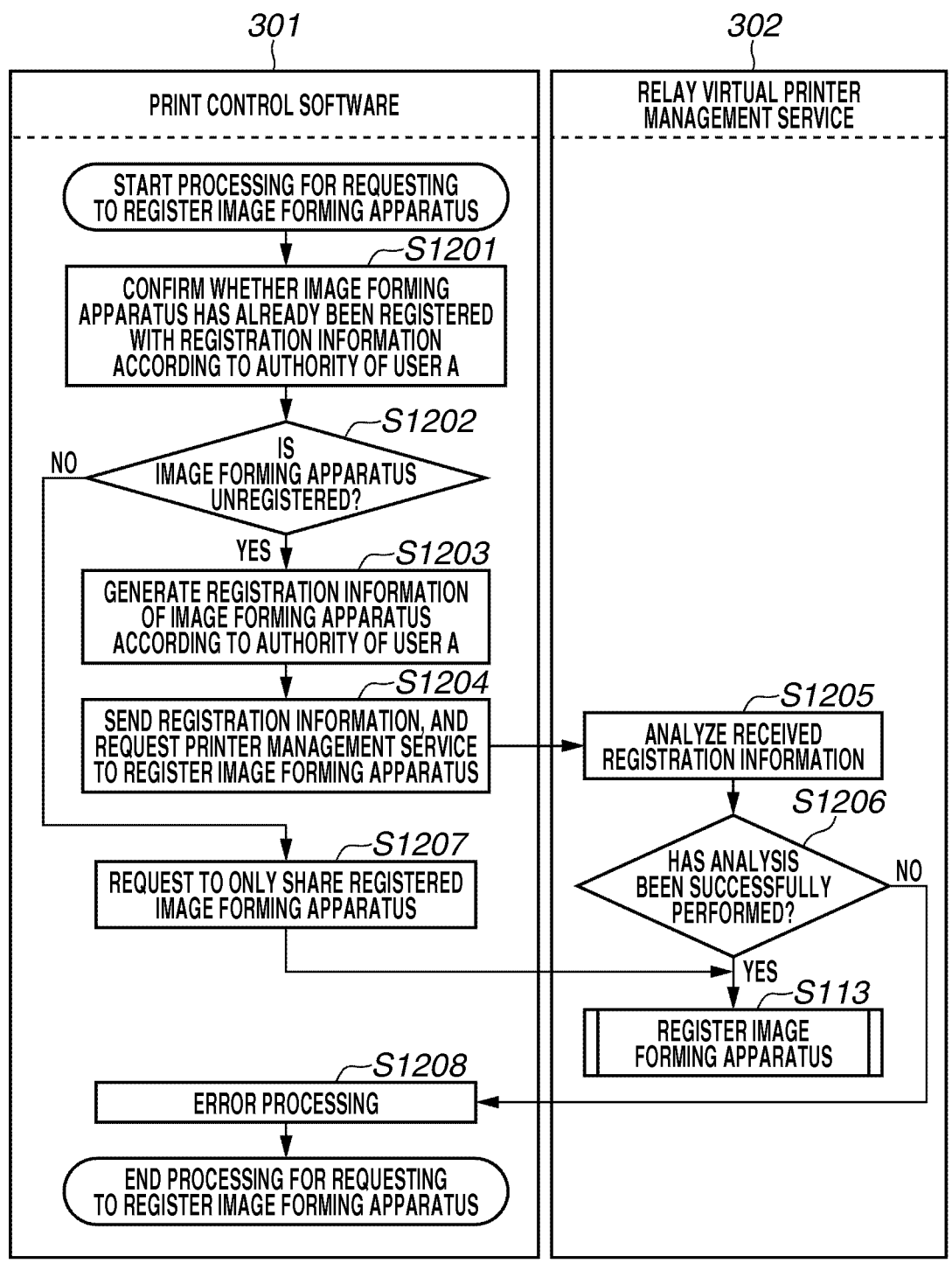

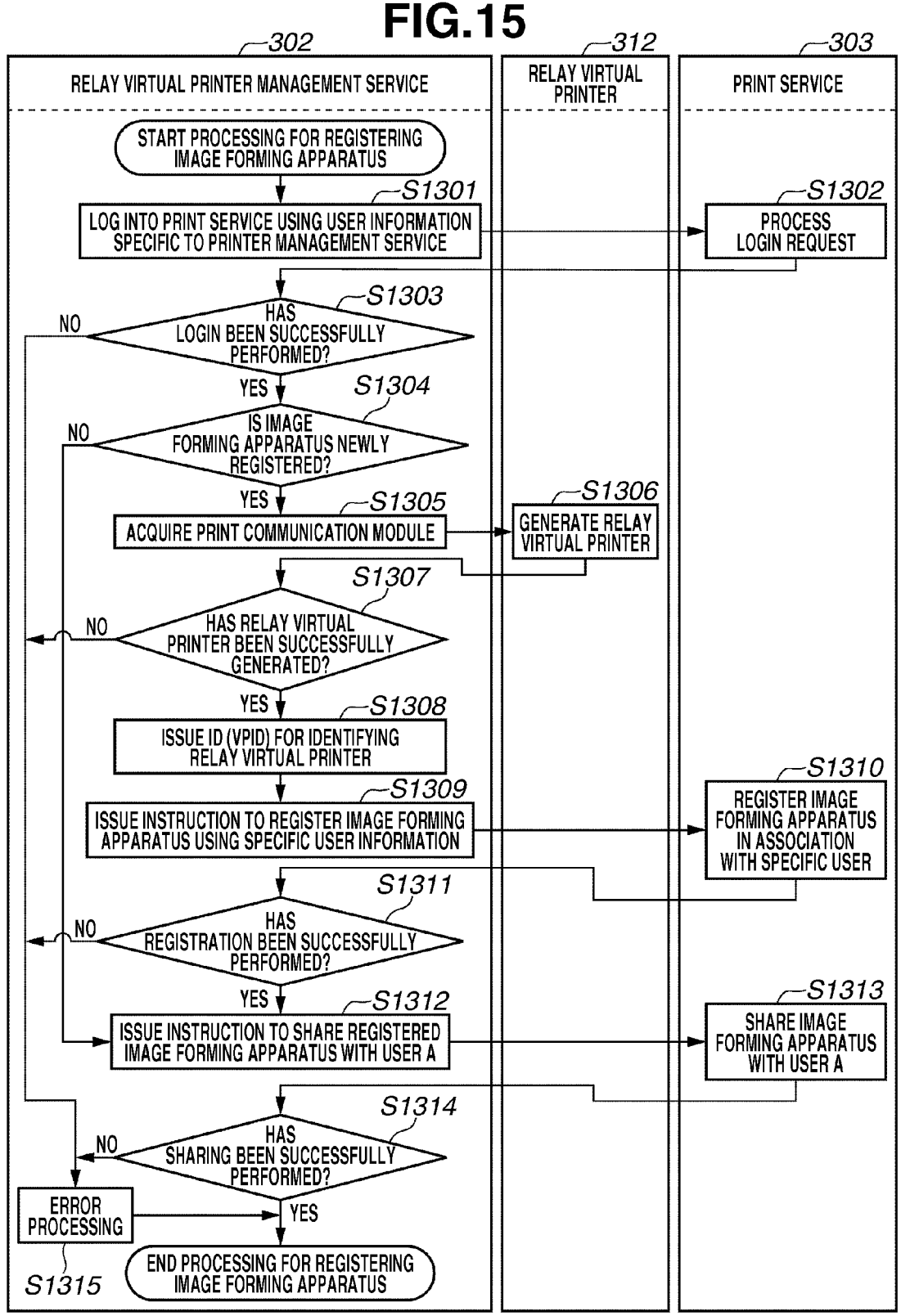

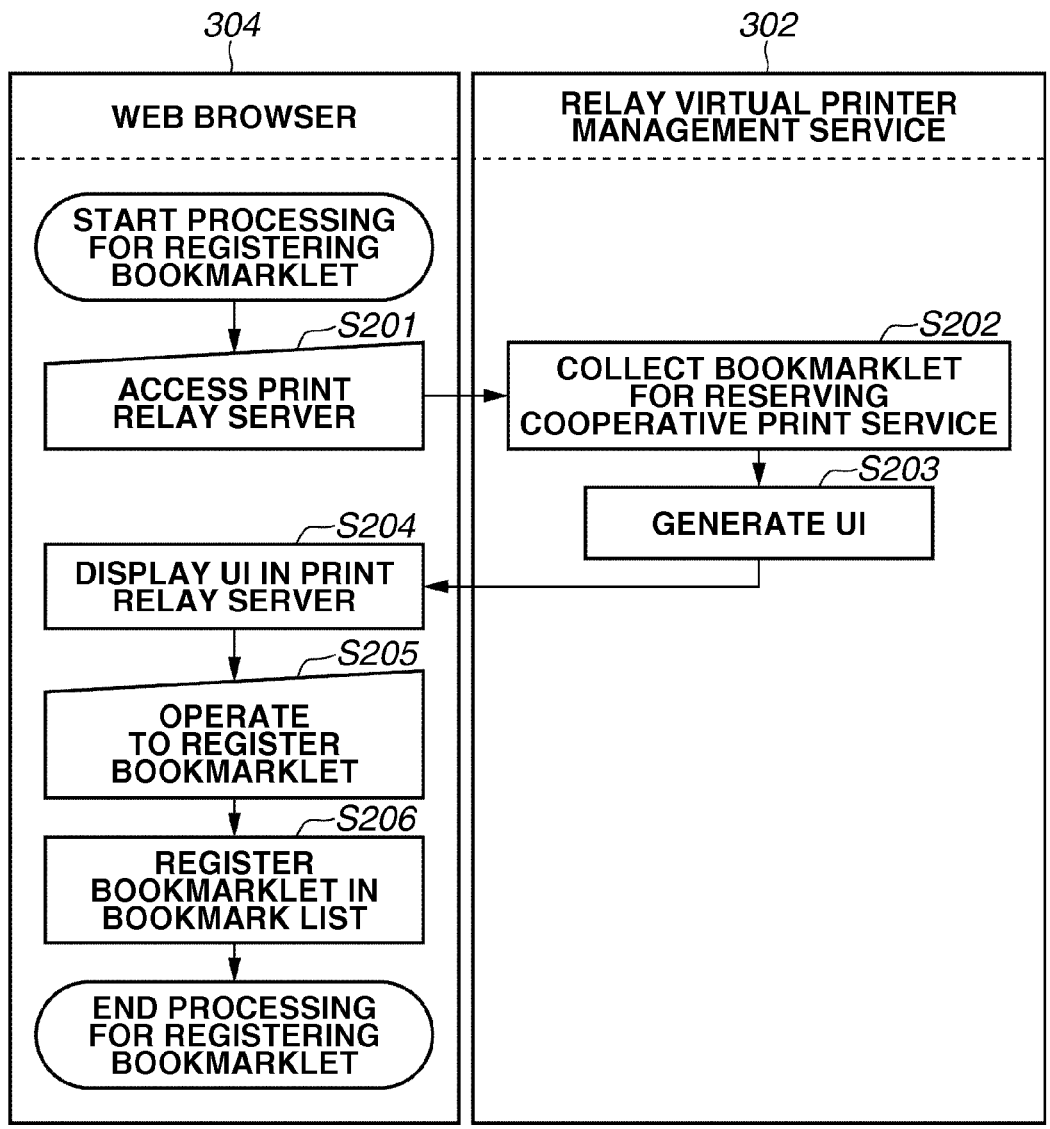

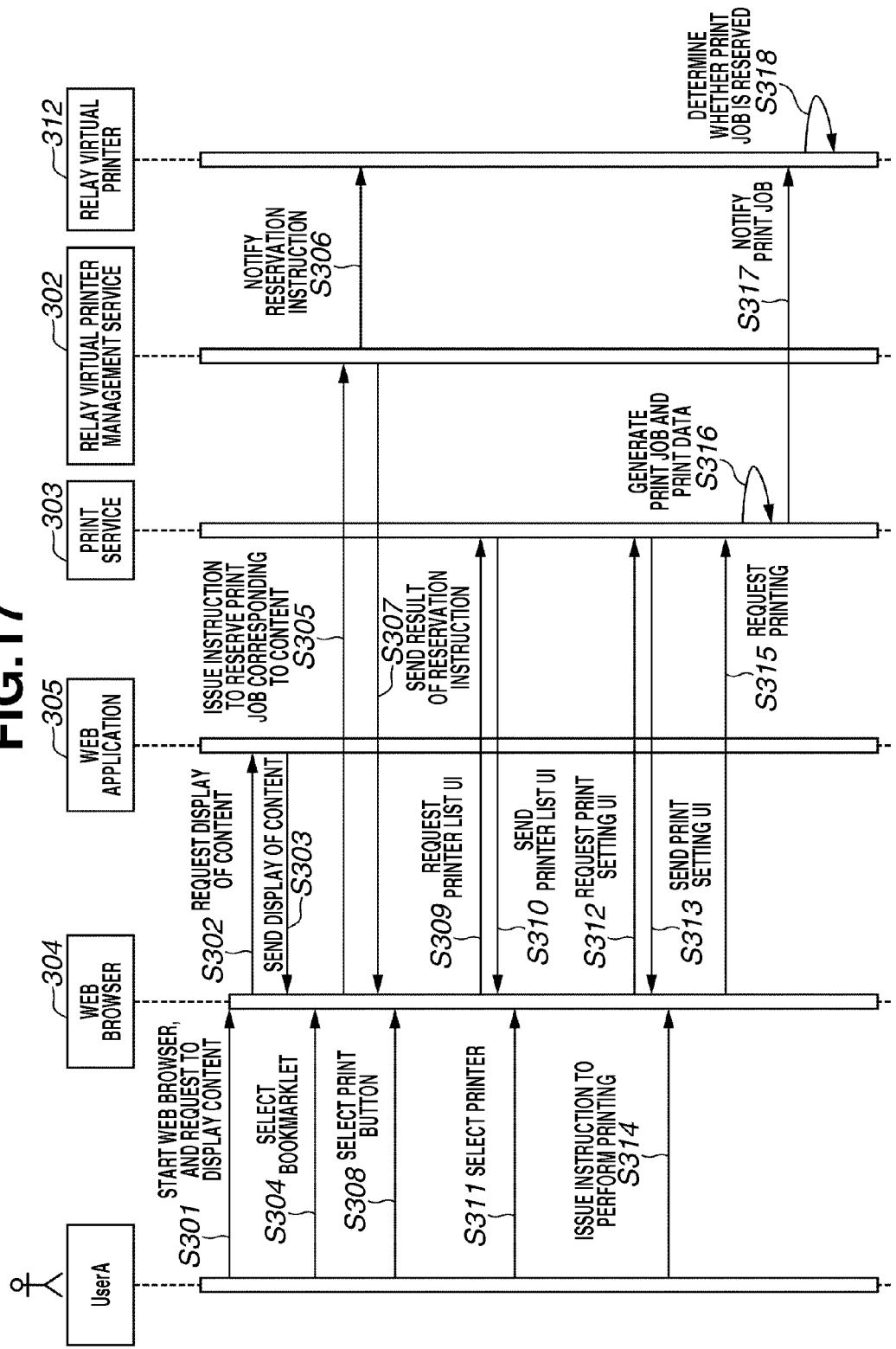

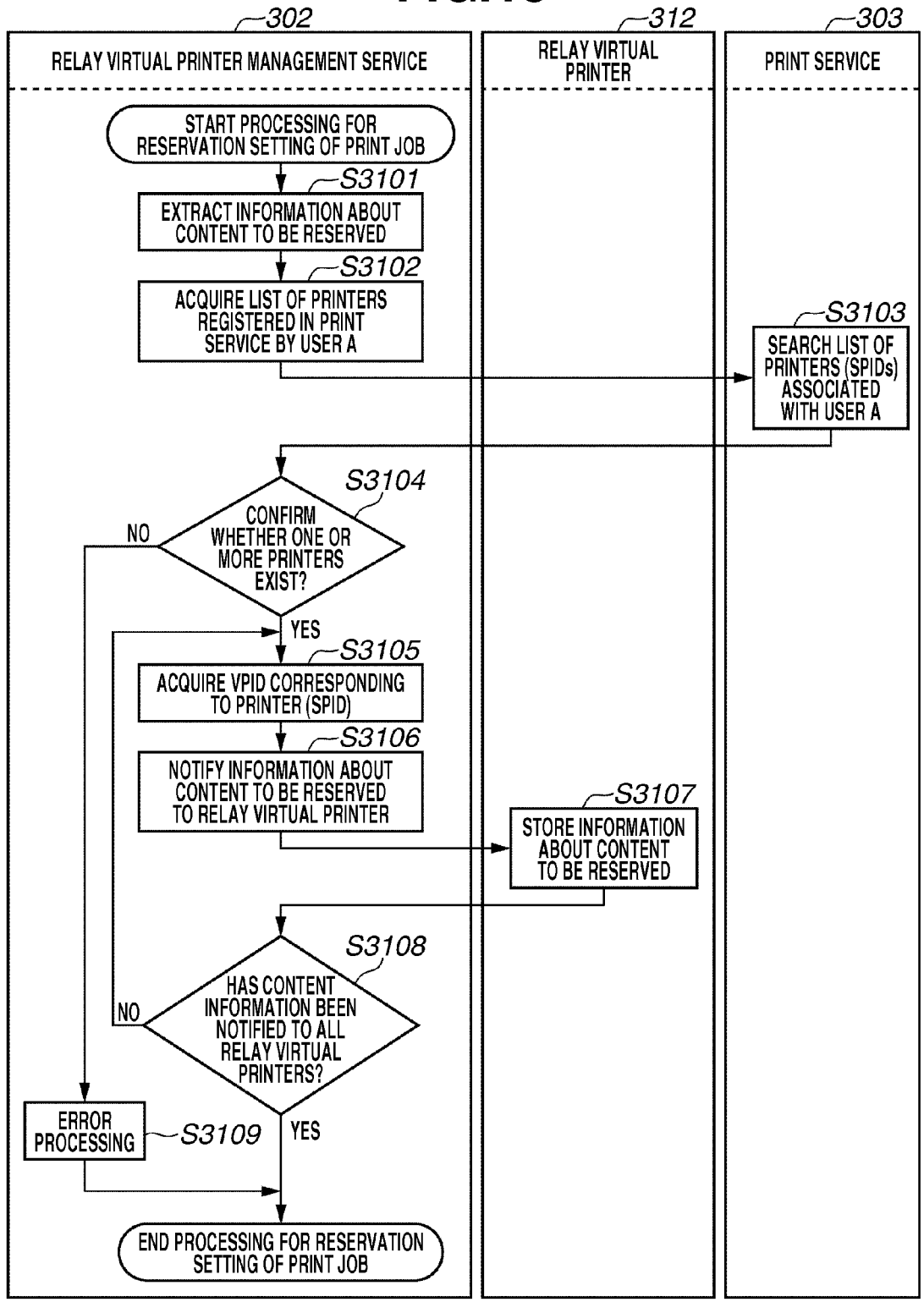

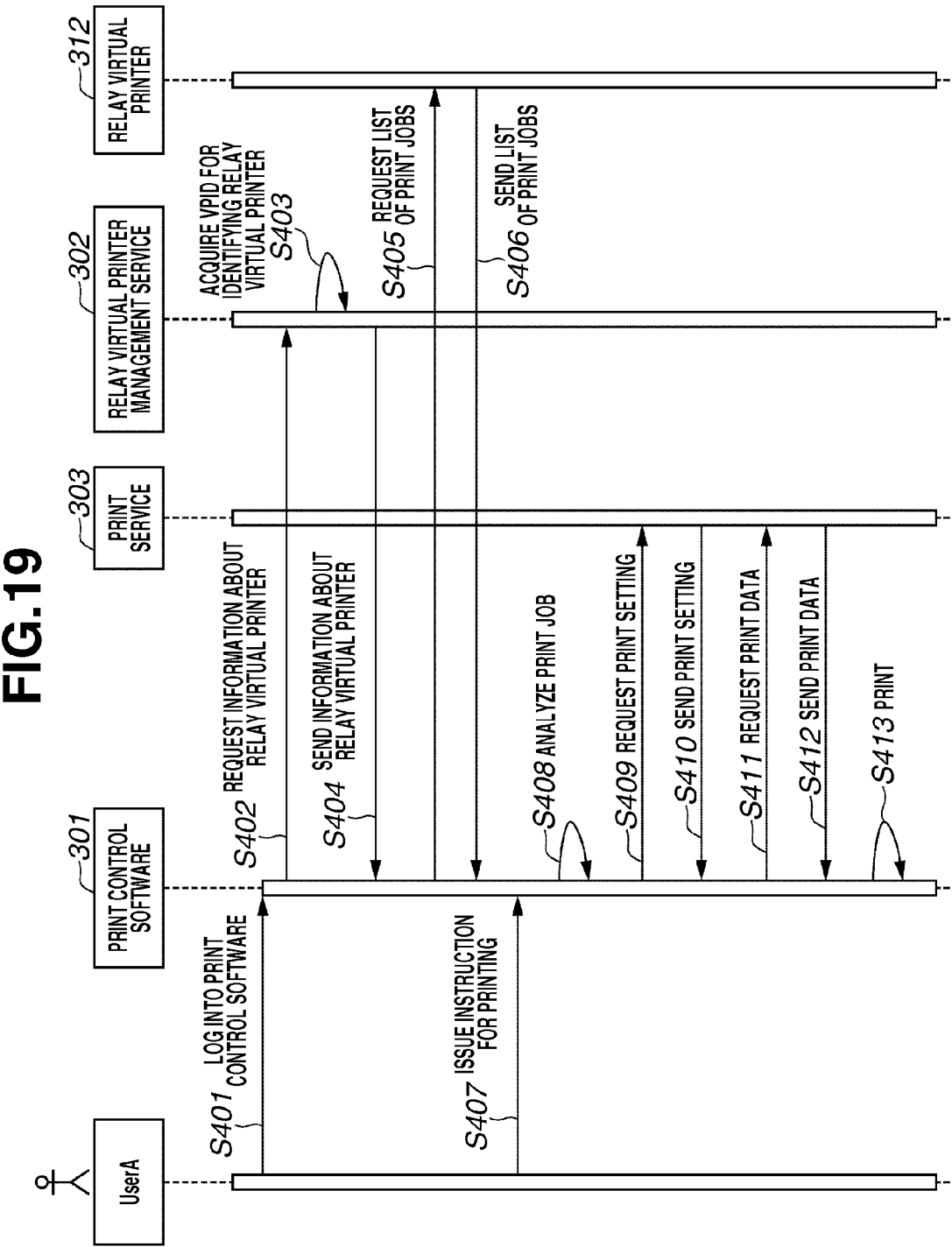

FIG.20

```
<?xml version="1.0" encoding="UTF-8" ?>
<PrintJob>
    <jobid>
        <Item>5846759561318635695</Item>  ~810
    </jobid>
    <contenttitle>
        <Item>Doc1</Item>  ~811
    </contenttitle>
    <jobstatus>
        <Item>QUEUED</Item>  ~812
    </jobstatus>
    <dataUrl>
        <Item>http://prt.srv.com/data/5846759561318635695</Item>  ~813
    </dataUrl>
    <settingUrl>
        <Item>http://prt.srv.com/setting/5846759561318635695</Item>  ~814
    </settingUrl>
</PrintJob>
```

800

PRINT PROCESSING METHOD, PRINT RELAY SERVER, CONTROL METHOD, AND STORAGE MEDIUM TO RESERVE PRINT DATA

BACKGROUND OF THE INVENTION

1. Field of the Invention

The present invention relates to a print processing method, a print relay server, a control method, and a storage medium.

2. Description of the Related Art

A configuration for a server to provide a service to a client has conventionally existed. As an example, there is a technique for a client to send a print instruction to a server and the server that has received the print instruction to convert a content to be printed into print data.

In recent years, a cloud computing system capable of using various types of applications operating in a server computer on the Internet to reduce management/maintenance cost of servers installed in a company and the applications has been paid attention to.

The cloud computing performs data conversion and data processing in a distributed manner using a large number of computing resources and simultaneously processes requests from a large number of clients as a main feature. On a cloud computing environment for implementing the cloud computing, there have currently been too many vendors respectively having web services mounted thereon and providing various types of services.

Among the vendors, Google (registered trademark) is to be paid attention to. Google (registered trademark) proposes services to be provided in cooperation with devices in addition to establishing a large number of large-scale data centers, and makes positive moves such as development of a mechanism for data communication between the devices and services.

Devices that cooperate with various types of services provided in the cloud computing can include a printer and a digital multifunction peripheral (collectively referred to as an image forming apparatus) used when paper media are scanned and computerized and electronic data is printed. The image forming apparatus may be installed in a company (an intranet). When an application exists on the internet, a method considering security such as a firewall is required for the application and the Internet to cooperate closely with each other, as compared with that when the image forming apparatus and the application exist in the intranet.

Google (registered trademark) has developed a method for data communication for providing services in cooperation with an image forming apparatus, and the image forming apparatus has opened an interface for the image forming apparatus to perform data communication with a cloud computing environment provided by Google (registered trademark). A user who desires to use the service is required to register information about the image forming apparatus in the cloud computing environment, i.e., a service environment for providing the service.

On the other hand, Japanese Patent Application Laid-Open No. 2000-276314 discusses a configuration in which a user reserves, when performing printing using an image forming apparatus, a print job in a print server once, operates an operation panel of the image forming apparatus, and outputs a desired print job. According to Japanese Patent Application Laid-Open No. 2000-276314, when a printer shared among a plurality of users and groups prints a highly-confidential document, the document can be managed as a print job in a print server on a network when a user name is input to issue a reservation instruction.

SUMMARY OF THE INVENTION

According to an aspect of the present invention, a print processing method performed by a content printing system including a client apparatus, a print server, a print relay server, and an image forming apparatus includes displaying, via a display unit of the client apparatus, a screen for editing a content using a web application service of a web application server, instructing, via an instruction unit of the client apparatus, the print relay server to reserve print data corresponding to the content edited on the screen and instructing the print server to print the content, converting, via a conversion unit of the print server, the content into print data in response to receipt of the instruction to print the content, receiving, via a reservation unit of the print relay server, the print data obtained by the conversion unit from the print server in response to receipt of the instruction to reserve the print data, and reserving the received print data, and receiving, via a printing unit of the image forming apparatus, the print data reserved by the reservation unit in response to receipt of the instruction to print the print data from a user, and performing printing based on the received print data.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7 illustrates an example of a user interface displayed on a web browser when a user accesses print control software in an image forming apparatus in the content printing system according to the exemplary embodiment of the present invention.

FIG. 9A illustrates an example of a screen displayed on a web browser when a user accesses a relay virtual printer management service in the content printing system according to the exemplary embodiment of the present invention.

FIG. 9B illustrates an example of a script constituting a bookmarklet registered in a web browser in the content printing system according to the exemplary embodiment of the present invention.

FIGS. 10A, 10B, and 10C illustrate examples of registration information of an image forming apparatus generated by print control software in the content printing system according to the exemplary embodiment of the present invention.

FIG. 11A illustrates information about a list of image forming apparatuses registered in a print service, which is managed by a relay virtual printer management service, in the content printing system according to the exemplary embodiment of the present invention.

FIG. 11B illustrates information about a list of image forming apparatuses registered in a print service, which is managed by print control software, in the content printing system according to the exemplary embodiment of the present invention.

FIG. 12A illustrates an example of users registered in a print service, which is managed by the print service, and information about image forming apparatuses usable by each user in the content printing system according to the exemplary embodiment of the present invention.

FIG. 12B illustrates an example of an ID of an image forming apparatus registered in a print service, which is managed by the print service, and information for managing registration information in the content printing system according to the exemplary embodiment of the present invention.

FIG. 13 is a sequence diagram illustrating an outline of a flow of processing for registering an image forming apparatus in a print service in the content printing system according to the exemplary embodiment of the present invention.

FIG. 14 is a flowchart illustrating a flow of processing for requesting a relay virtual printer management service to register an image forming apparatus in the content printing system according to the exemplary embodiment of the present invention.

FIG. 15 is a flowchart illustrating a flow of processing for registering an image forming apparatus in a print service in the content printing system according to the exemplary embodiment of the present invention.

FIG. 16 is a flowchart illustrating a flow of processing for registering a bookmarklet used when a user instructs a print relay server to reserve a print job in a web browser in the content printing system according to the exemplary embodiment of the present invention.

FIG. 17 is a sequence diagram illustrating an outline of a flow of processing for a relay virtual printer to acquire a print job from a print service after a user issues an instruction to perform printing in the content printing system according to the exemplary embodiment of the present invention.

FIG. 18 is a flowchart illustrating a flow of processing for a relay virtual printer management service to perform setting to reserve a print job corresponding to a content to be reserved in a relay virtual printer in the content printing system according to the exemplary embodiment of the present invention.

FIG. 19 is a sequence diagram illustrating a flow of processing for a user to operate an image forming apparatus to output a print job reserved in a relay virtual printer in the content printing system according to the exemplary embodiment of the present invention.

FIG. 20 illustrates an example of a print job to be sent to a print control software control unit by a relay virtual printer in the content printing system according to the exemplary embodiment of the present invention.

DESCRIPTION OF THE EMBODIMENTS

Various exemplary embodiments, features, and aspects of the invention will be described in detail below with reference to the drawings.

Japanese Patent Application Laid-Open No. 2000-276314 premises a configuration in which one vendor handles all requirements of the present invention such as a unit, a print server, and a printer that issues print instructions, respectively. On the other hand, when a service server provided in cloud computing and a device provided by a device vendor cooperate with each other, control of a print job is handled in the cloud computing. Therefore, the configuration discussed in Japanese Patent Application Laid-Open No. 2000-276314 may not implement reservation printing in the above-mentioned system.

A reservation print service is not prepared in the cloud computing. Even if the print job is received from the cloud computing, information included in the print job may not include information about a user, and the print job is not necessarily be reserved. The reservation printing has a characteristic of identifying a user and providing a job corresponding to the identified user. If there is no information capable of identifying the user, as described above, the reservation printing cannot be implemented.

The present invention is directed to implementing, when a vendor for providing a print service and a vendor for providing a device cooperate with each other, reservation printing regardless of a specification of the vendor for providing the print service. More specifically, only a job to be reserved by the user is reserved in a relay server, and the reserved job is managed as a reservation print target.

First, terms used in exemplary embodiments of the present invention will be described. Reservation printing means processing for storing a print job (including print data and a print setting) in a storage device and causing an image forming apparatus to print the stored print job in response to a print instruction from a user. A storage device may be a memory in an image forming apparatus or a memory in an external apparatus connected to the image forming apparatus. An instruction to reserve print data means that a user designates a print job or print data as a reservation print target. For example, the print job or the print data can be designated via a user interface before a print instruction.

Figure 1:
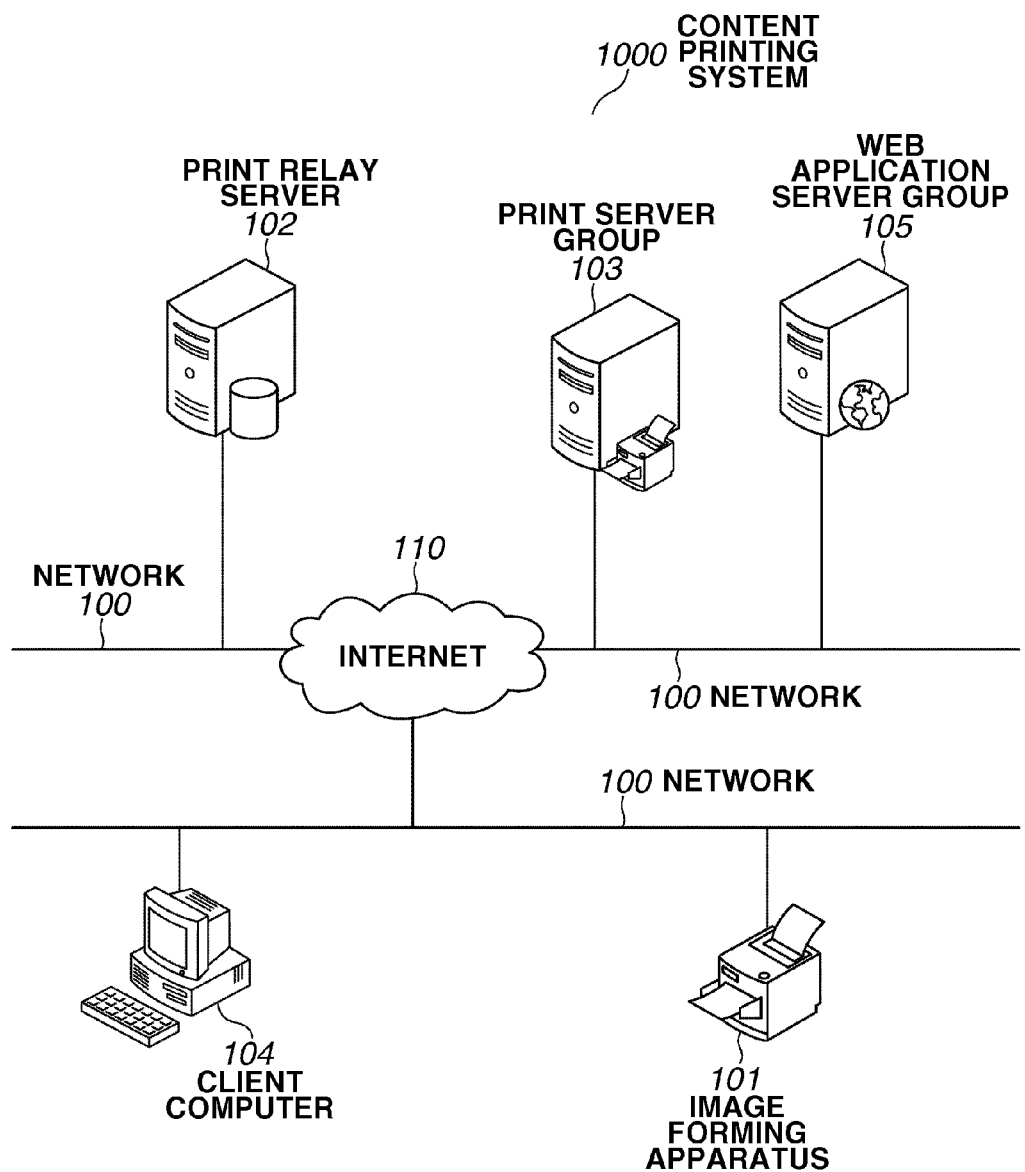
FIG. 1 is a system conceptual diagram of a content printing system according to an exemplary embodiment of the present invention.

FIG. 1 illustrates a configuration of a content printing system 1000 according to an exemplary embodiment of the present invention. The content printing system 1000 includes a client computer 104 and an image forming apparatus 101. The two apparatuses are arranged in a user environment, and are connected to each other via a network 100. The network 100 is connected to the Internet 110.

The content printing system 1000 includes a web application server group 105 and a print server group 103. The two server groups are provided from the same vendor, and are connected to each other via the network 100. The network 100 is connected to the Internet 110.

In the present exemplary embodiment, the two server groups may be connected to each other via the Internet 110, although connected to each other via the network 100 in the present exemplary embodiment. The content printing system 1000 further includes a print relay server 102. The print relay server 102 is connected to the network 100, and the network 100 is connected to the Internet 110. The apparatuses and the server groups constituting the content printing system 1000 are connectable via the Internet 110, and can perform data communication with each other. While each of the apparatuses includes one apparatus, it may include a plurality of apparatuses. While the number of servers constituting each of the server groups is plural, it may be one. Accordingly, a server group including a plurality of servers may be merely referred to as a "server" in the present exemplary embodiment. The web application server group 105 is also referred to as a web application server.

Figure 2:
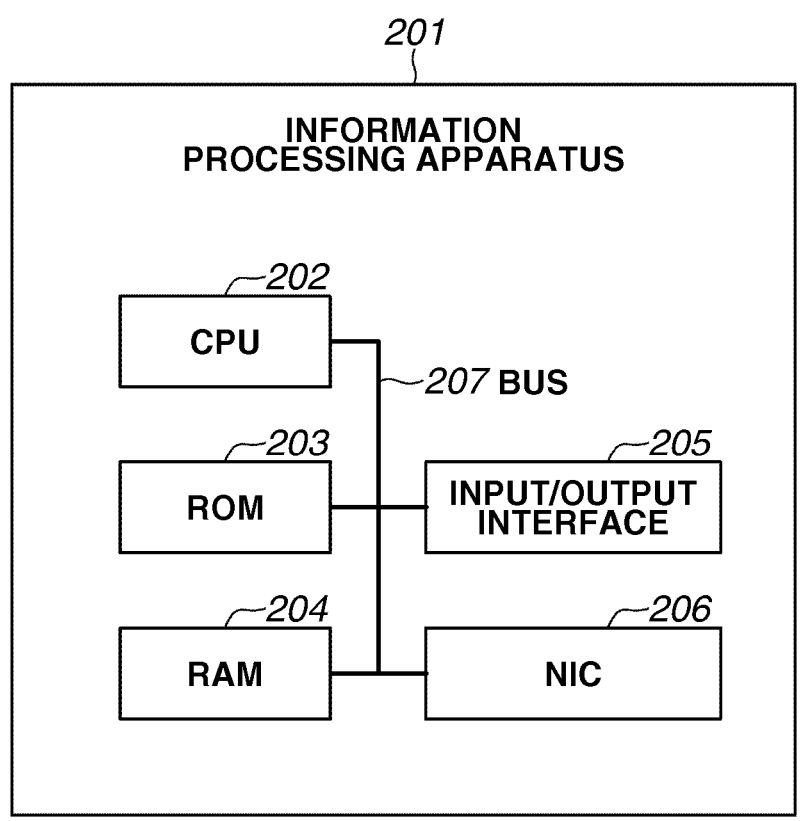
FIG. 2 is a hardware configuration diagram of each of apparatuses and server groups constituting the content printing system according to the exemplary embodiment of the present invention.

FIG. 2 illustrates a hardware configuration of each of the apparatuses and the server groups constituting the content printing system 1000.

Each of the apparatuses and the server groups 201 constituting the content printing system 1000 includes a central processing unit (CPU) 202, a read-only memory (ROM) 203, a random access memory (TAM) 204, an input/output interface 205, and a network interface card (NIC) 206. The CPU 202 executes various programs and implements various functions. The ROM 203 stores various programs. The CPU 202 loads the program stored in the ROM 203 into the RAM 204, and executes the program. The RAM 204 is a unit also used as a temporary working storage area. The input/output interface 205 is an interface unit for receiving data from a pointing device (not illustrated) in addition to sending data to a display (not illustrated) connected to each of the apparatuses and the server groups 201. The NIC 206 is a unit for connecting each of the apparatuses and the server groups 201 constituting the content printing system 1000 to the network 100. The above-mentioned units can send and receive data via a bus 207.

The image forming apparatus 101 is loaded with a printing unit (not illustrated). The printing unit can send and receive data to each of the units via the bus 207. The printing unit can print a raster image on a recording medium.

Figure 3:
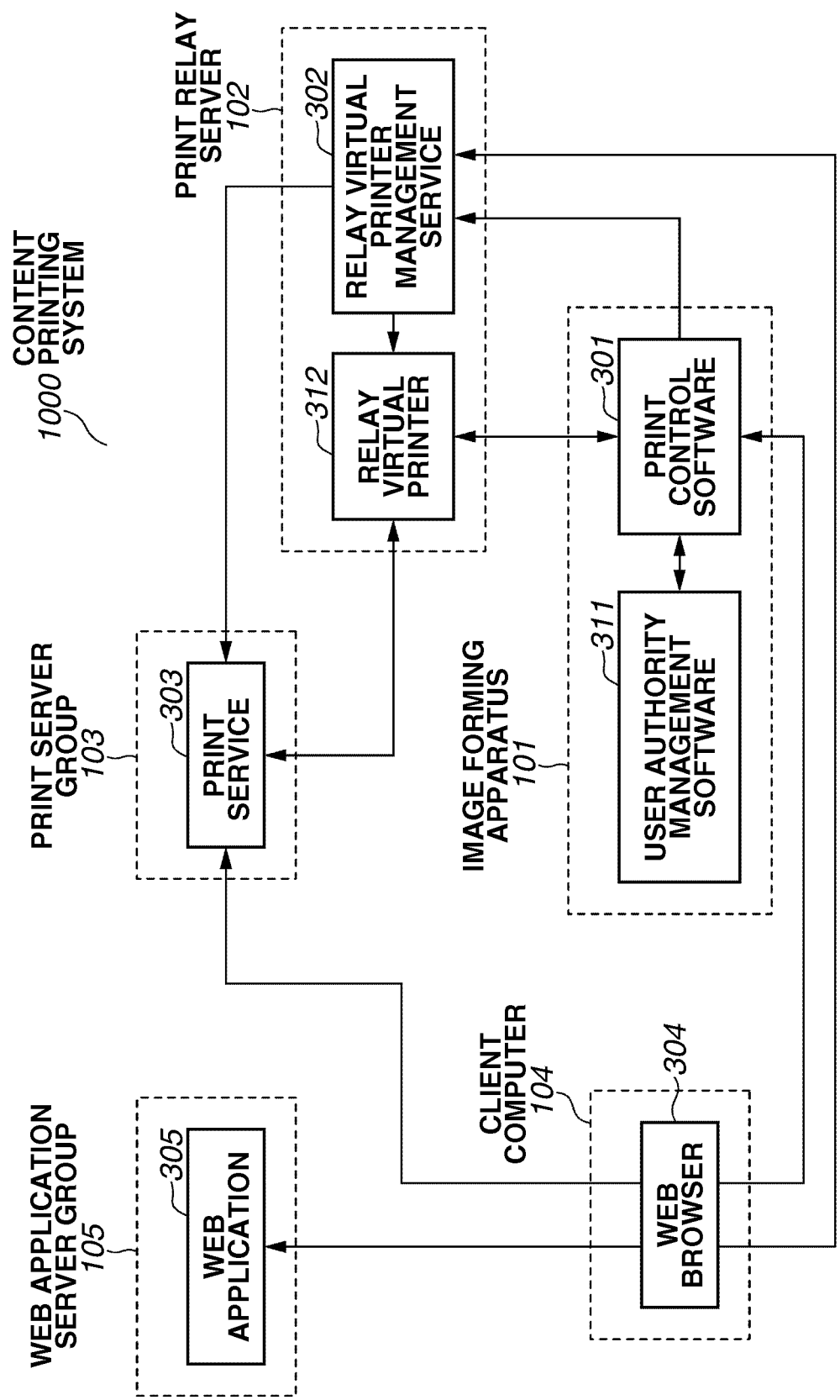
FIG. 3 is a schematic software configuration diagram illustrating an example of the content printing system according to the exemplary embodiment of the present invention.

FIG. 3 illustrates a software configuration of each of the apparatuses and the server groups 201 constituting the content printing system 1000. Programs for implementing functions of the software configurations illustrated in FIG. 3 are respectively stored in the ROMs 203 in the apparatuses and the server groups 201. The CPU 202 loads the programs into the RAMs 204 in the apparatuses and the server groups 201 and executes the programs, respectively, so that the functions are implemented.

An outline of the respective functions of the apparatuses and the server groups 201 will be described. The functions are classified into two series. The first series includes functions of sending information about the image forming apparatus 101 to a relay virtual printer management service 302 in the print relay server 102, generating a relay virtual printer 312 with the relay virtual printer management service 302, and then registering the image forming apparatus 101 in a print service 303 in the print server group 103. Print control software 301 in the image forming apparatus 101 sends the information about the image forming apparatus 101 to the relay virtual printer management service 302 based on the function of the image forming apparatus 101 usable by a user with user authority management software 311 for managing user's authority. This processing is referred to as registration processing.

The second series includes functions of sending an instruction to print a content generated and stored in the web application server group 105 to the print server group 103 and causing the image forming apparatus 101 to print the print data acquired from the print server group 103. After the print relay server 102 acquires print jobs from the print server group 103, a print job to be reserved, which has been designated by the user, is reserved. Accordingly, the user operates the image forming apparatus 101 so that print data can be sent to the print relay server 102 from the print server group 103 and reserved therein and then printed by the image forming apparatus 101. A print job other than the print job to be reserved is automatically output to the image forming apparatus 101 without print data being acquired from the print server group 103 and reserved. More specifically, the print job is automatically output using a panel of the image forming apparatus 101 even if the user does not give a print instruction. This processing is referred to as print processing.

The web application server group 105 includes a web application 305. The web application server group 105 virtualizes a plurality of servers as one server, and the one server implements a function of the web application 305. The web application server group 105 starts a plurality of virtual machines in the one server, and implements the function of the web application 305 for each of the virtual machines.

The web application 305 provides a document generation service. When the user desires to distribute materials in a company meeting, for example, the user uses the document generation service to generate the materials. When the client computer 104 uses the web application 305, the web application 305 need not be installed in the client computer 104, and a web browser 304 is used. The web application 305 sends screen information for generating the materials to the web browser 304. The web application 305 performs authentication based on user information including a user identification (ID) and a password input by the user via the web browser 304, and sends the screen information for generating the materials depending on whether the authentication has been successfully performed. The web browser 304, which has received the screen information, displays a generation screen for generating a document based on the screen information, and the user generates the materials to be distributed in the meeting using the generation screen. The web application 305 receives information relating the materials generated using the generation screen by the user, generates a content based on the received information, and stores the generated content in a storage device in the web application server group 105. The web application 305 is a web application service for providing not only the document generation service but also a mail service and a schedule service. The user can receive various types of services without installing an application in the client computer 104 by using the web application service.

Figure 8A:
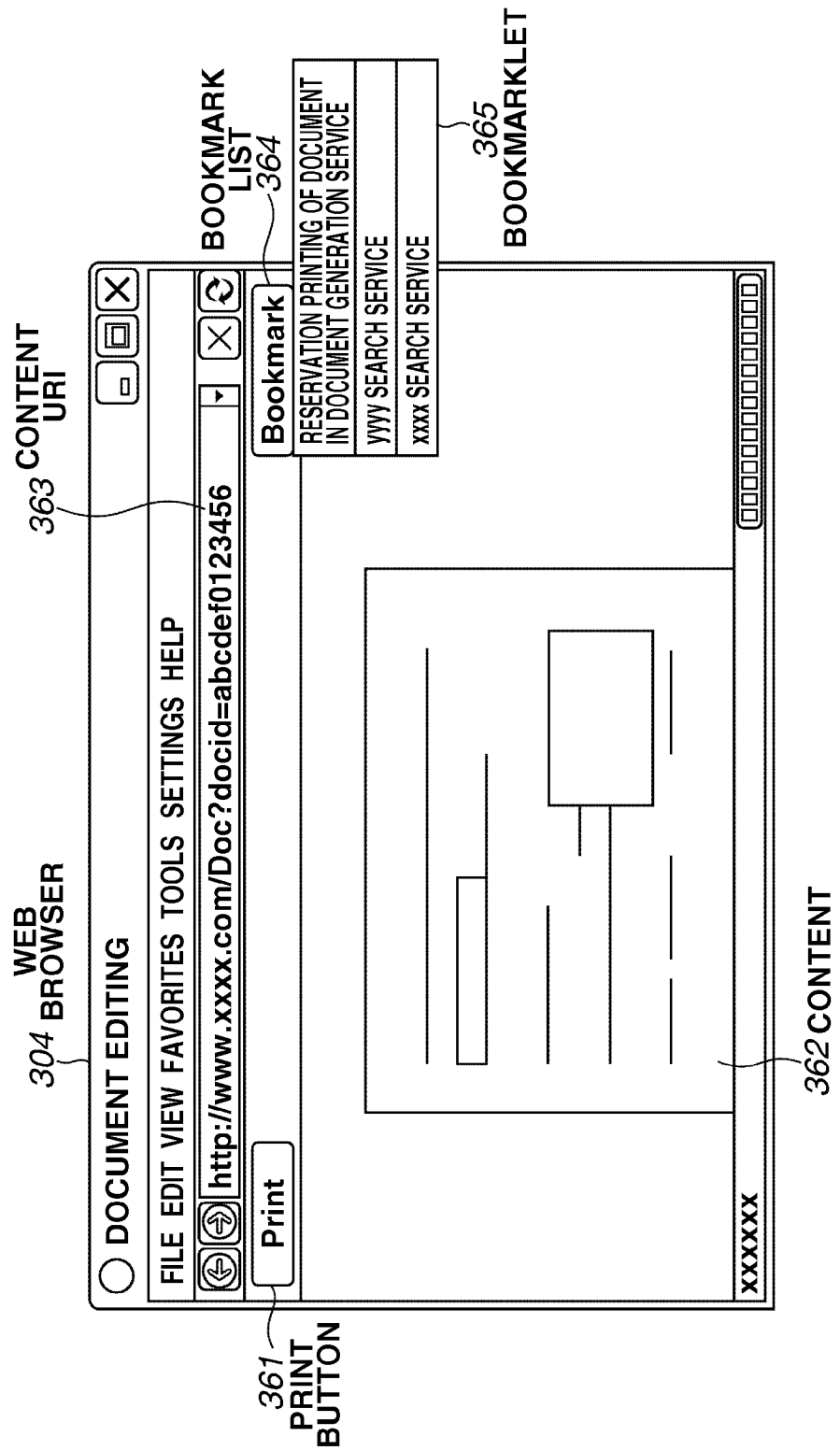
FIG. 8A illustrates an example of a screen of a document generation service provided by a web application displayed on a web browser in the content printing system according to the exemplary embodiment of the present invention.

FIG. 8A illustrates an example of a screen of the document generation service, provided by the web application 305, displayed on the web browser 304. This screen corresponds to a screen provided from the document generation service for editing a content. The user can issue an instruction to print a generated content 362 by pressing a print button 361. The web browser 304 displays the content 362 stored in the document generation service provided by the web application 305 on the screen according to a content uniform resource identifier (URI) 363 designated by the user. A bookmark list 364 is a function of the web browser 304, and displays a list of bookmarks registered in the web browser 304. The bookmark means a function of registering any URI, and makes the registered URI movable only by a user's selection operation. A bookmarklet 365 is one type of bookmark. When the user selects the bookmarklet 365 while the web browser 304 displays the content 362, an instruction to reserve a print job corresponding to the content 362 in the print relay server 102 is sent to the print relay server 102. The sent instruction includes content identification information for identifying the content 362 displayed on the web browser 304.

Determination whether the print job corresponding to the content 362 is ready to be reserved in the print relay server 102 is displayed on another window (not illustrated) of the web browser 304. This operation enables the content 362, which the user has issued an instruction to print, to be reserved in the print relay server 102. When an attempt to print the content 362 is made without selecting the bookmarklet 365, the image forming apparatus 101 is made to directly print the content 362 without print data being reserved in the print relay server 102. While an instruction to reserve the print job using the bookmarklet 365 is issued in the present exemplary embodiment, the present invention is not limited to this. Another form such as plug-in may be used as long as it can implement a required function.

The web application 305 receives information indicating that the print button 361 has been pressed, and sends an instruction to access the print server group 103, i.e., a redirect instruction to the web browser 304. The redirect instruction includes a request to acquire a list of image forming apparatuses 101 corresponding to the user who uses the web browser 304, content identification information for identifying a content that the user has issued an instruction to print, and user information. The web application 305 sends, when the print server group 103 requests to acquire a content, the content to be acquired to the print server group 103 based on content identification information for identifying a content sent together with the acquisition request.

Figure 8B:
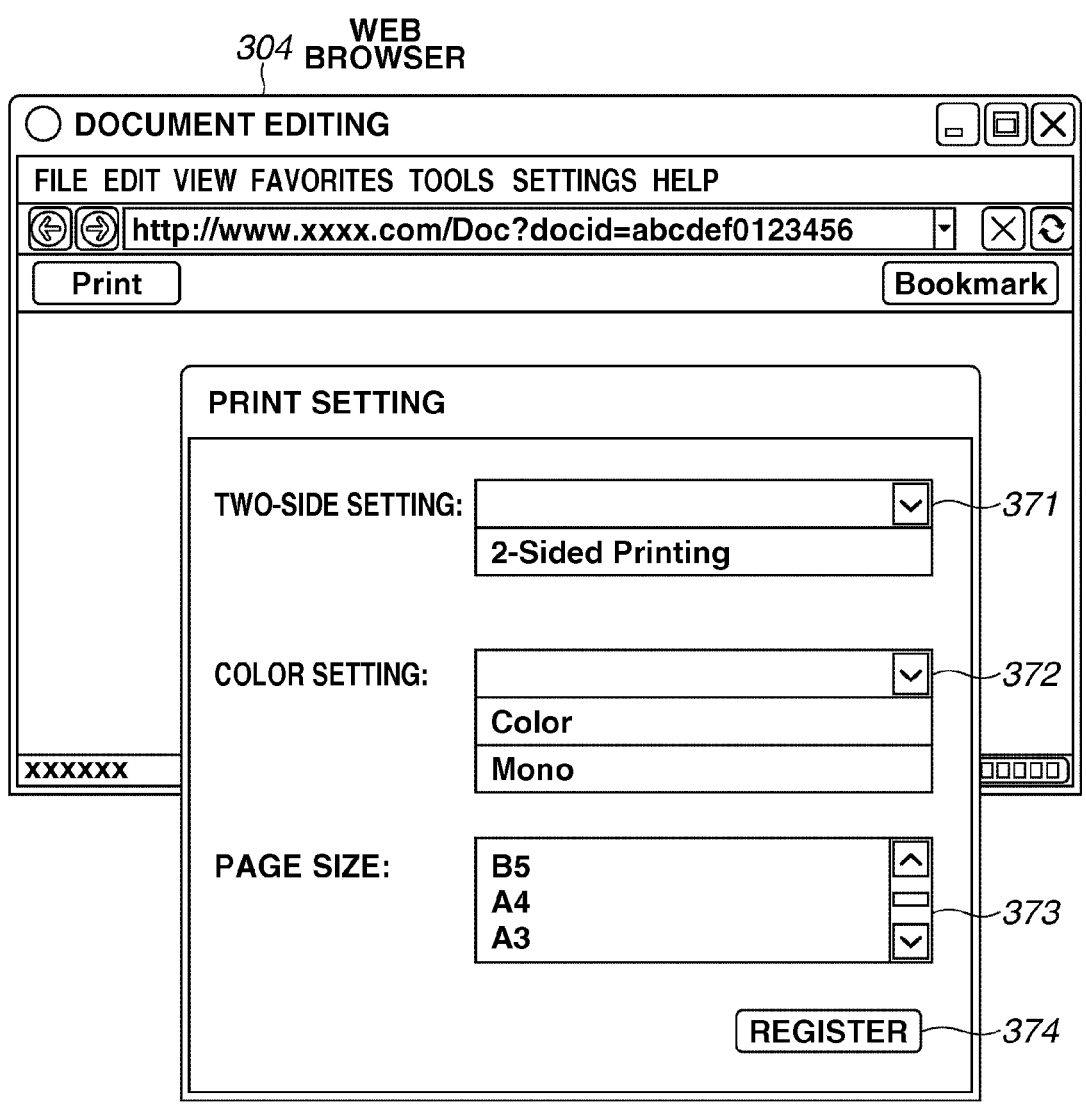
FIG. 8B illustrates an example of a print setting screen corresponding to an image forming apparatus selected by a user displayed on a web browser in the content printing system according to the exemplary embodiment of the present invention.

The web browser 304 acquires a list of image forming apparatuses 101 usable for printing by the user from the print server group 103 that has been accessed, and displays the list. The web browser 304 acquires a print setting screen corresponding to the image forming apparatus 101 selected by the user from the list of image forming apparatuses 101 from the print server group 103, and displays the print setting screen. FIG. 8B illustrates a print setting screen corresponding to the image forming apparatus 101 selected by the user and displayed by the web browser 304. The web browser 304 sends a print setting value set by the user on the print setting screen to the print server group 103.

The print control software 301 in the image forming apparatus 101 acquires a print job retained by the print service 303 via the relay virtual printer 312, and outputs the acquired print job using a printing unit (not illustrated). In this case, when the user selects the bookmarklet 365 while the content 362 is displayed on the web browser 304, a print job corresponding to the content 362 is retained as a print job to be reserved in the print relay server 102. Accordingly, the print job to be reserved is not output until the user issues an instruction to perform printing in the image forming apparatus 101, and a print job other than the print job to be reserved is automatically output in the image forming apparatus 101. Details of the functions of the apparatuses and the server groups will be described below.

Figure 4:
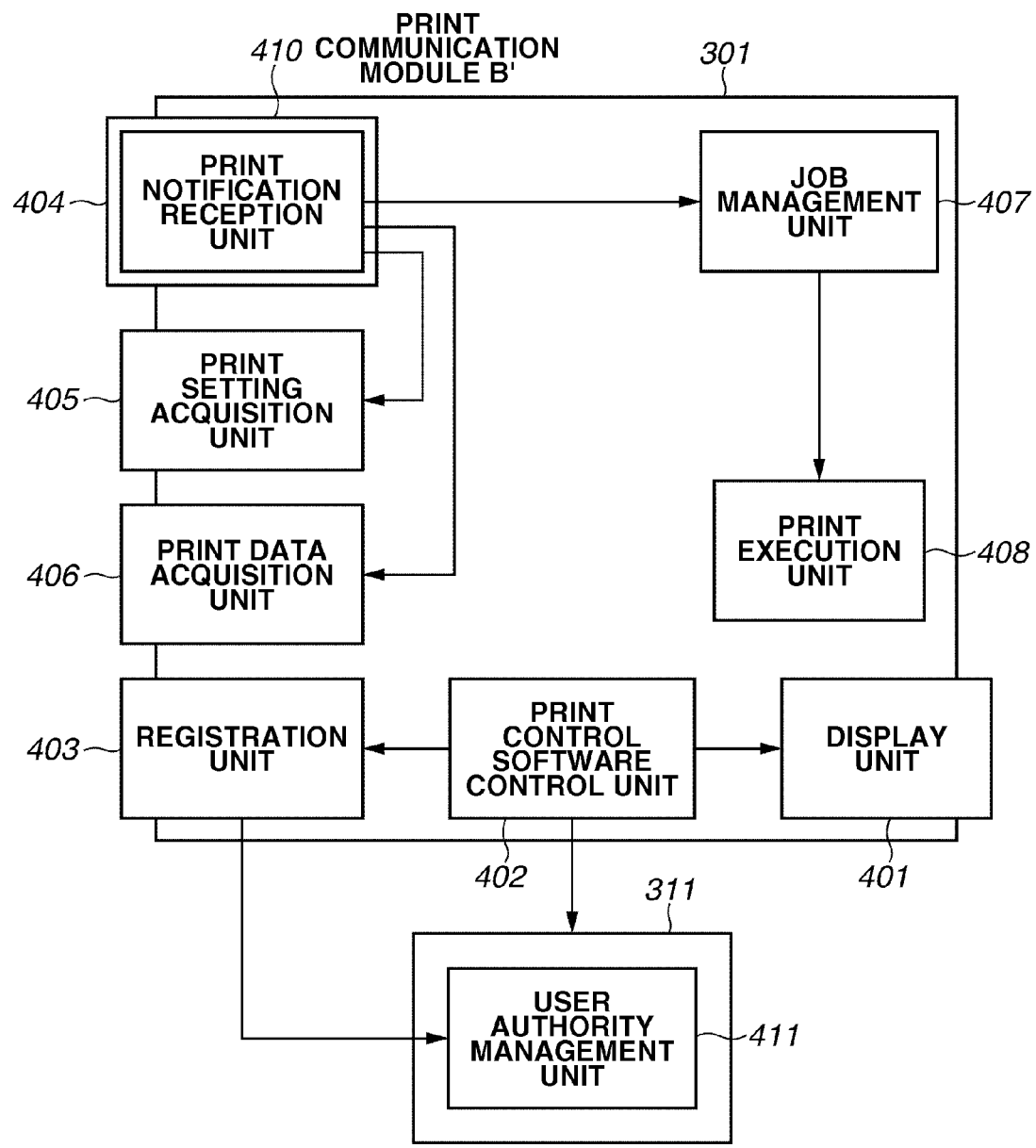
FIG. 4 is a software configuration diagram of an image forming apparatus in the content printing system according to the exemplary embodiment of the present invention.

The functions of the image forming apparatus 101 will be described in detail with reference to FIG. 4. The image forming apparatus 101 includes print control software 301 and user authority management software 311, and implements each of functions illustrated in FIG. 4.

A display unit 401 displays various screens of the print control software 301 on an operation panel (not illustrated) of the image forming apparatus 101 or in response to access from the web browser 304 in the client computer 104. FIG. 7 illustrates an example of a user interface (UI) screen displayed when the user accesses the print control software 301 via the web browser 304. The UI screen includes a print menu list 351 for displaying a list of printing functions/setting menus of the image forming apparatus 101 and a print service display area 352 for displaying a list of print services 303 in which the image forming apparatus 101 can be registered. Further, the print service display area 352 includes a registration link 353 to the print service 303 operated when the user registers the image forming apparatus 101 in the print service 303. A form, an area configuration, and control of the screen illustrated in FIG. 7 are not limited. Any form may be used as long as it can implement a required function.

A print control software control unit 402 controls each of functions in the print control software 301. A registration unit 403 generates, when the user issues an instruction to register the image forming apparatus 101 in the print service 303 (PrintService A) using a UI screen of the print control software 301, registration information. The print control software unit 402 sends the registration information to the relay virtual printer management service 302 in the print relay server 102. The registration unit 403 acquires the function, which can be used by the image forming apparatus 101 depending on user's authority, from a user authority management unit 411, reflects the acquired function on the registration information, and sends the function to the relay virtual printer management service 302. Further, the registration unit 403 sends information for identifying the print service 303 for registering the image forming apparatus 101, e.g., a name "PrintService A" of the print service 303, together with the registration information, to the relay virtual printer management service 302. In this case, the print service 303 and user information required to access the web application 305 may be sent.

Figure 10A:
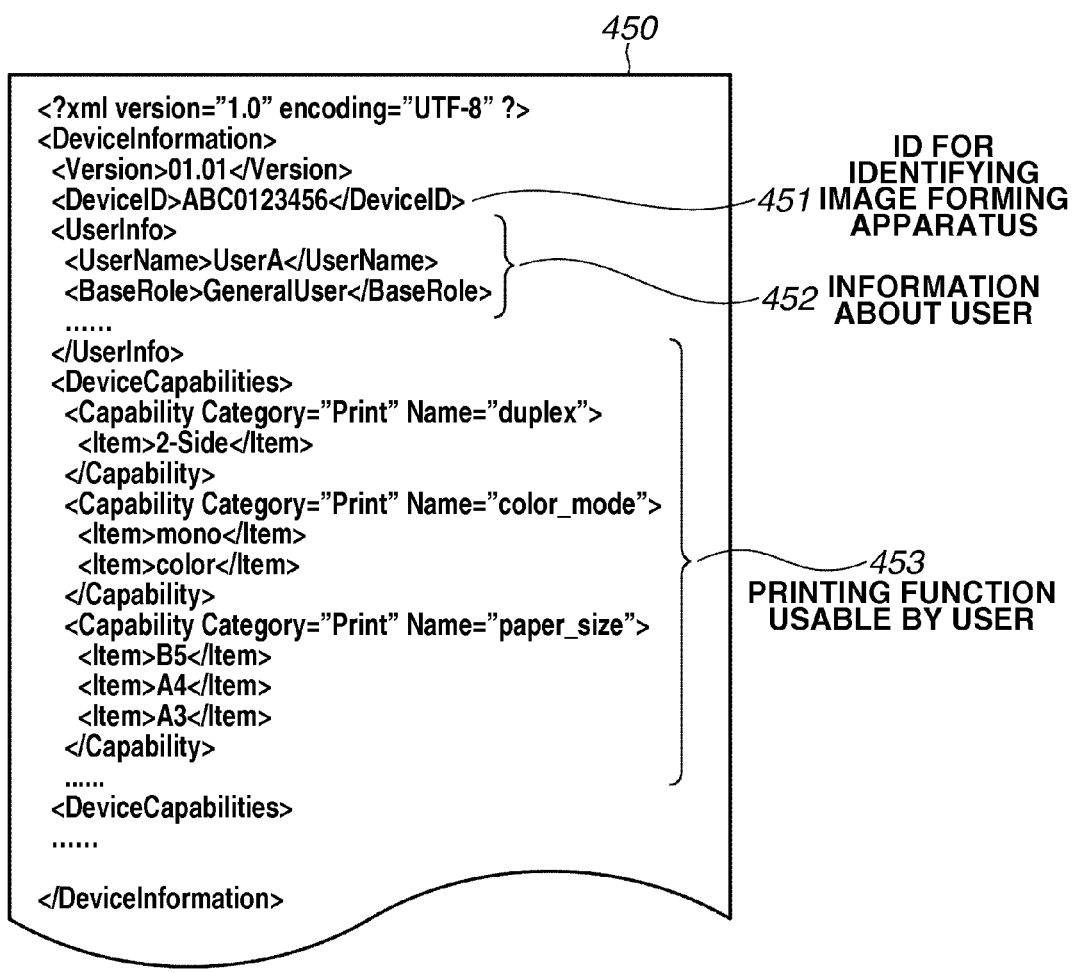

FIG. 10A illustrates an example of the registration information to be sent to the relay virtual printer management service 302 by the registration unit 403. Registration information 450 is declared using a schema such as an Extensible Markup Language (XML) schema. In the registration information 450, an ID for identifying an image forming apparatus 101 (451), information about a user (452), and a printing function of an image forming apparatus 101 usable by a user depending on a user's authority (453) are declared. In the information about a user (452), a user name and information for identifying user's authority are declared. In the printing function usable by a user (453), information such as color mode, two-sided printing, and paper size about a printing function are declared. FIGS. 10B and 10C illustrate examples of registration information to be sent to the relay virtual printer management service 302 by users who differ in authority, respectively. For example, a printing function usable by an administrator user (AdminUser) is declared in FIG. 10B, and a printing function usable by a guest user (GuestUser) is declared in FIG. 10C.

The registration information 450 may include information other than the above-mentioned information. For example, security information for ensuring a content of the registration information 450. A method for sending the registration information 450 is not limited to a method for sending the registration information 450 to the relay virtual printer management service 302 in a schema format such as an XML schema format. The above-mentioned information may be sent according to an interface opened by the relay virtual printer management service 302.

The print control software 301 includes a print communication module B' 410. A print notification reception unit 404 in the print communication module B' 410 acquires the list of print jobs acquired from the print service 303 by the print relay server 102 and stored as a reservation print target from the print relay server 102. The print notification reception unit 404 confirms notification information acquired from the print relay server 102, and notifies the information to a print setting acquisition unit 405 and a print data acquisition unit 406, respectively. The print setting acquisition unit 405 acquires a print setting from the print service 303 based on a storage location of the notified information. The print data acquisition unit 406 acquires print data from the print service 303 based on a storage location of the notified information. The acquired print setting and print data are sent to the job management unit 407 via the print notification reception unit 404. The job management unit 407 acquires the print data and the print setting, and instructs a print execution unit 408 to perform printing. The print execution unit 408, which has received the instruction, generates a raster image based on the print setting and the print data, and instructs the printing unit to print the generated raster image. The print job to be reserved is not automatically output and is retained in the print relay server 102 according to the instruction from the user.

Figure 5A:
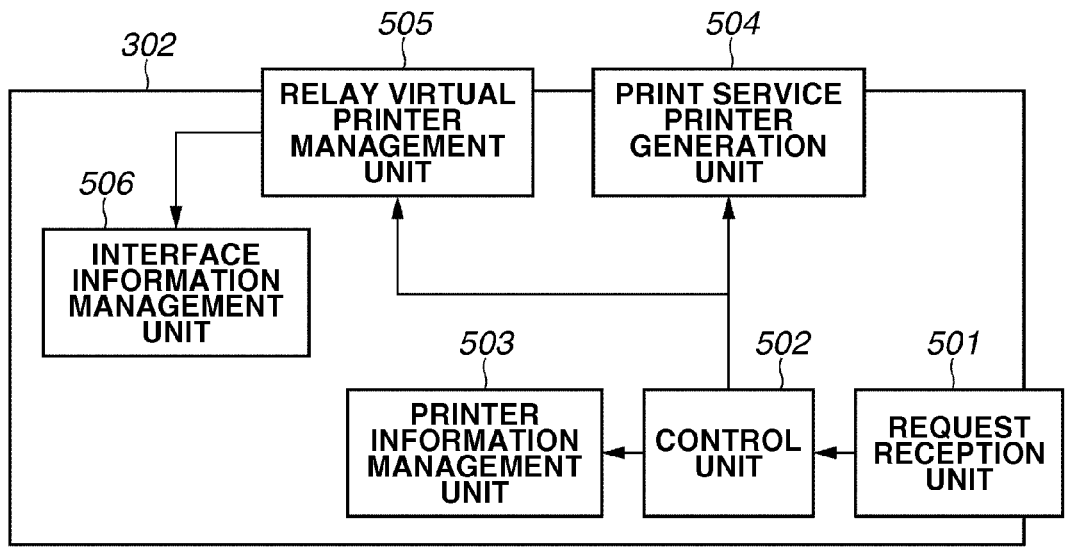
FIG. 5A is a software configuration diagram of a relay virtual printer management service in a print relay server in the content printing system according to the exemplary embodiment of the present invention.
Figure 5B:
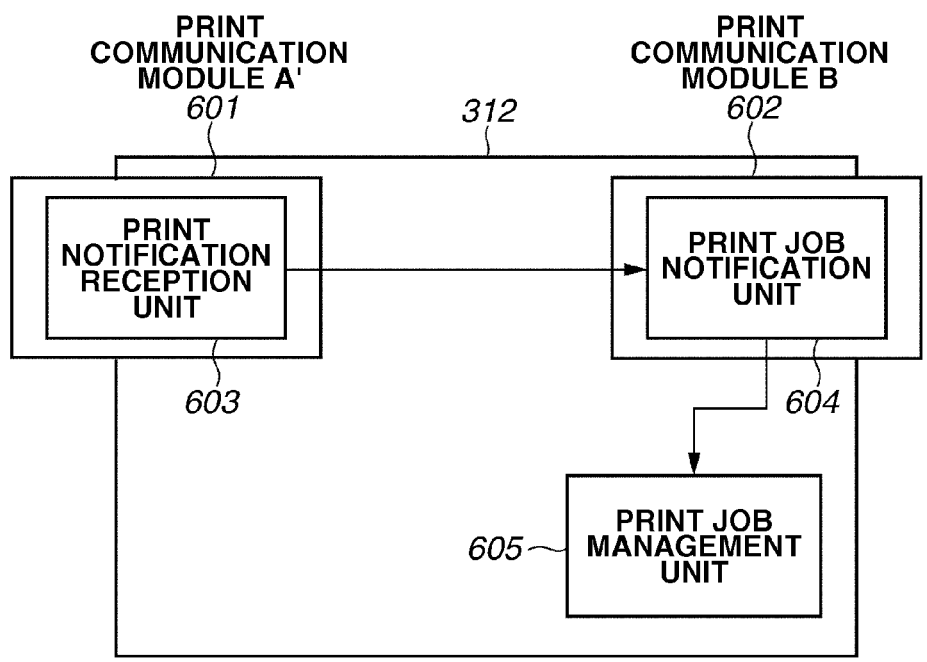
FIG. 5B is a software configuration diagram of a relay virtual printer in a print relay server in the content printing system according to the exemplary embodiment of the present invention.

Details of functions of the print relay server 102 will be described below. The print relay server 102 includes the relay virtual printer management service 302 and the relay virtual printer 312, which respectively implement functions illustrated in FIGS. 5A and 5B.

A request reception unit 501 receives a registration instruction and registration information that are sent from the registration unit 403 in the print control software 301 in the image forming apparatus 101 according to the instruction from the user. A control unit 502 acquires and interprets the registration information received by the request reception unit 501, information for identifying the print service 303, and user information for accessing the print service 303, and then instructs the relay virtual printer management unit 505 to generate the relay virtual printer 312.

The relay virtual printer management unit 505 uses the information for identifying the print service 303 received from the print control software 301, to acquire a print communication module A' 601 for communicating with the print service 303 from an interface information management unit 506, and sets the print communication module A' 601 in the relay virtual printer 312. The print communication module A' 601 is a module for communicating with the print service 303 and enabling communication with a print communication module A 707 in the print service 303, described below. The relay virtual printer 312 includes a print communication module B 602 for communicating with the image forming apparatus 101, and can communicate with the print communication module B' 410 in the print control software 301, described above.

The relay virtual printer management unit 505 issues a virtual printer ID (VPID) serving as identification information for identifying the relay virtual printer 312 after generating the relay virtual printer 312, and notifies the control unit 502 of the VPID. The VPID, i.e., a generated virtual printer, has a one-to-one correspondence with the image forming apparatus 101.

The control unit 502 instructs a print service printer generation unit 504 to register the image forming apparatus 101 in the print service 303 after generating the relay virtual printer 312. In this case, the control unit 502 notifies the print service printer generation unit 504 of the user information. The print service printer generation unit 504 performs authentication using user information specific to the relay virtual printer management service 302 to access the print server group 103. When the authentication has been successfully performed, the print service printer generation unit 504 sends received registration information of the image forming apparatus 101 and a printer name to the print service 303 according to the instruction from the control unit 502, and registers the image forming apparatus 101 in the print service 303. The print service printer generation unit 504 is responsive thereto, to receive a service printer ID (SPID) as the information for identifying the image forming apparatus 101 registered in the print service 303.

The print service printer generation unit 504 then uses the received SPID, to request the print service 303 to share the registered image forming apparatus 101 with a user who has received the image forming apparatus 101 from the control unit 502. The control unit 502 acquires the SPID from the print service printer generation unit 504, and instructs a printer information management unit 503 to store the information about the image forming apparatus 101 registered in the print service 303. The printer information management unit 503 stores an ID for identifying the image forming apparatus 101, information for identifying authority, a VPID for identifying the relay virtual printer 312, and an SPID in association with one another, as illustrated in FIG. 11A.

As described above, the relay virtual printer 312 includes the print communication module A' 601 and the print communication module B 602. A print notification reception unit 603 in the print communication module A' 601 receives a print job notification from the print service 303. The print notification reception unit 603 confirms a storage location of print data and a storage location of a print setting, which serve as information required to perform printing in the image forming apparatus 101 with the print job notification. The print notification reception unit 603 notifies a print job notification unit 604 of the print job notification received from the print service 303. The print job notification unit 604, which has been notified, stores and reserves a print job in a print job management unit 605.

When a request to acquire the list of print jobs is received from the print communication module B' 410 in the print control software 301 in the image forming apparatus 101, a list of print jobs stored in the print job management unit 605 is sent to a print communication module B' 410.

Figure 6:
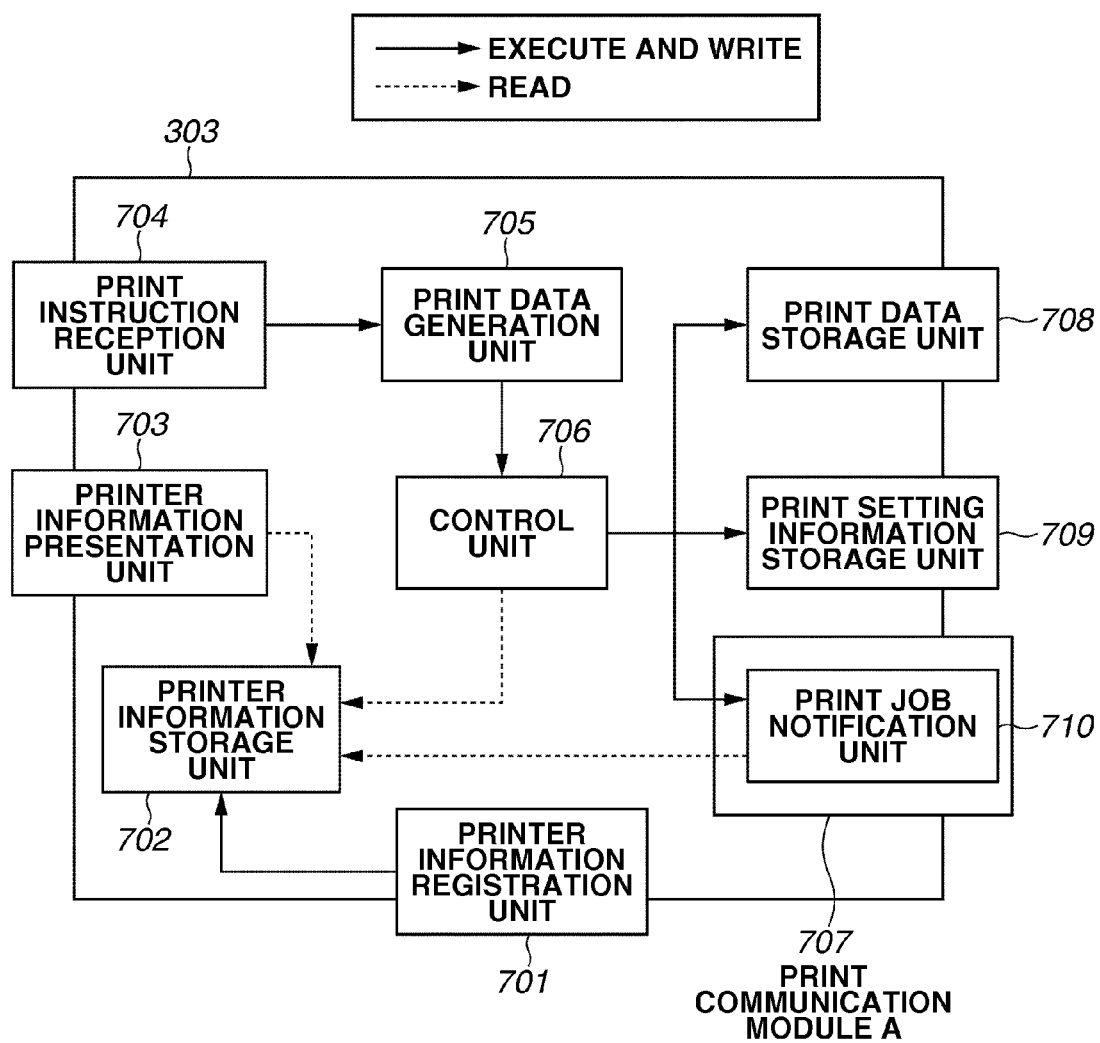
FIG. 6 is a software configuration diagram of a print server in the content printing system according to the exemplary embodiment of the present invention.

Details of functions of the print server group 103 will be described below. The print server group 103 includes the print service 303, and implements each of the functions illustrated in FIG. 6. The print server group 103 virtualizes a plurality of servers as one server, and the one server implements functions of the print service 303. The print server group 103 starts a plurality of virtual machines in the one server, and implements the functions of the print service 303 for the virtual machines, respectively. The print service 303 illustrated in FIG. 3 represents one of the virtual machines.

A printer information registration unit 701 receives a request to register the image forming apparatus 101, which is sent from the relay virtual printer management service 302. The printer information registration unit 701 generates an SPID when it newly registers the image forming apparatus 101. The SPID, together with the registration information of the image forming apparatus 101, which has been received from the relay virtual printer management service 302, is registered in a printer information storage unit 702 in association with the user. The printer information registration unit 701 sends the SPID, which has been generated when the image forming apparatus 101 is registered, to the relay virtual printer management service 302.

FIG. 12A illustrates an example of users registered in the print service 303 managed in the printer information storage unit 702 and information about image forming apparatuses 101 usable by the users. A list of SPIDs for identifying the usable image forming apparatuses 101 is stored and managed for each of the users. FIG. 12B illustrates an example of information for managing registration information of the image forming apparatuses 101 corresponding to the generated SPIDs in association with each other. The registration information of the image forming apparatus 101 is stored as a file, and a path of the file storing the registration information corresponding to the SPID is managed. The example illustrated in FIGS. 12A and 12B may be managed together with information other than the above-mentioned information, or may be managed in the above-mentioned information/format.

As illustrated in FIG. 12A, SPIDs "1234695692482390462" and "4260548430266234523" registered by a user "P-ServiceManager" in the printer information storage unit 702 are shared with a user "P-User A". More specifically, registration information of an image forming apparatus 101 registered by the user "P-ServiceManager" can be shared with the user "P-User A", and a print setting displayed on a print setting screen corresponding to the image forming apparatus 101 illustrated as an example in FIG. 8B is also shared therewith. Further, the users do not individually register registration information of the same image forming apparatus 101. Therefore, only the user "P-ServiceManager", which has first registered the image forming apparatus 101, maybe updated as registration information of the image forming apparatus 101 already registered in processing for updating the image forming apparatus 1, described below.

A printer information presentation unit 703 is responsive to receiving of a request to acquire a list from the web browser 304, to send the list. The printer information presentation unit 703 generates a list of image forming apparatuses 101 usable by a user stored in the printer information storage unit 702 in association with the user. The printer information presentation unit 703 receives an SPID of a symbol corresponding to the image forming apparatus 101 selected by the user from the list. The symbol means an icon for the image forming apparatus 101 displayed in the list. The printer information presentation unit 703 identifies registration information of the image forming apparatus 101 stored in the printer information storage unit 702 based on the received SPID, generates a print setting screen, and sends the generated print setting screen to the web browser 304. The printer information storage unit 702 generates a print setting screen illustrated in FIG. 8B from the registration information of the image forming apparatus 101. As illustrated in FIG. 8B, the printer information storage unit 702 generates the print setting screen so that only a print setting, which can be processed by the print service 303, can be selected.

A print instruction reception unit 704 receives the print setting set via the print setting screen and the SPID from the web browser 304. The print instruction reception unit 704 receives content identification information for identifying a content, which the user issues an instruction to print, when accessed by the web browser 304 based on the redirect instruction.

A print data generation unit 705 receives the content identification information from the print instruction generation unit 704, and acquires a content to be printed from the web application 305 based on the received content identification information. The print data generation unit 705 receives the print setting input by the user from the print instruction reception unit 704, and the SPID corresponding to the image forming apparatus 101 selected by the user. The print data generation unit 705 performs print data conversion for converting the content acquired from the web application 305 into print data based on the content and the print setting.

A control unit 706 acquires the print data, the print setting, and the SPID from the print data generation unit 705. The print communication module A 707 can communicate with the print communication module A' 601 in the relay virtual printer 312 in the print relay server 102, and is an interface for data communication therebetween. The print communication module A 707 has a print job notification unit 710.

A print data storage unit 708 receives and stores the print data from the control unit 706. A print setting information storage unit 709 receives and stores the print setting from the control unit 706. The print data storage unit 708 and the print setting information storage unit 709 receive a storage instruction from the control unit 706, to perform storage processing. The control unit 706 instructs the print job notification unit 710 to send notification information in response to receiving the end of the storage from the print data storage unit 708 and the print setting information storage unit 709.

Steps of processing for registering the image forming apparatus 101 in the content printing system according to the exemplary embodiment of the present invention in the print service 303 will be specifically described.

A User A accesses the print control software 301 in the image forming apparatus 101 via the web browser 304, and registers the image forming apparatus 101 in the print service 303 in cooperation with the relay virtual printer management service 302. FIG. 13 is a sequence diagram illustrating an outline of a flow of processing for registering the image forming apparatus 101 in the print service 303.

In step S101, the User A starts the web browser 304, and issues an instruction to access the print control software 301 by inputting a uniform resource locator (URL), for example. In step S102, the web browser 304, which has received the instruction from the User A in step S101, sends a request to the print control software 301, and requests a UI screen.

In step S103, the display unit 401 in the print control software 301, which has received the request of the UI screen from the web browser 304 in step S102, returns a front page (not illustrated) of the print control software 301, and displays the front page on the web browser 304. In this case, the display unit 401 returns, when it is determined that the User A do not log into the image forming apparatus 101, a front page having a control for inputting login information to the web browser 304, and displays the front page. Any unit may determine whether the User A has already logged into the image forming apparatus 101.

In step S104, the User A inputs, to the front page having the control for inputting the login information, which has been displayed on the web browser 304 in step S103, the login information. In step 5105, the web browser 304, which has received the instruction from the User A in step S104, sends the login information input by the User A to the print control software 301, and requests to log into the image forming apparatus 101. In step S106, the print control software control unit 402 in the print control software 301, which has received the login request in step S105, confirms whether a user can log into the image forming apparatus 101 using the received login information.

In step S107, the print control software control unit 402 requests the user authority management unit 411 in the user authority management software 311 to acquire authority information of the User A when it confirms in step S106 that the User A has successfully logged in. In step S108, the user authority management unit 411, which has received the request to acquire the authority information of the User A in step S107, returns the authority information of the User A to the print control software control unit 402. The authority information of the User A means the information about the user (452) and the printing function of the image forming apparatus 101 usable by the user according to user's authority (453) in FIG. 10A, described above. The authority information of the User A may include information other than the information about the user (452) and the printing function usable by the user (453).

In step s109, the display unit 401 generates a UI screen of the print control software 301 in response to receiving of the confirmation whether the User A has successfully logged in, in step S106, and a result of acquiring the authority information of the User A in step S108, and displays the UI screen on the web browser 304. FIG. 7 illustrates an example of the UI screen displayed when the User A accesses the print control software 301 via the web browser 304, as previously described. In step S110, the User A operates the UI screen of the print control software 301, which has been displayed on the web browser 304 in step S109, and issues an instruction to register the image forming apparatus 101 in the print service 303. In step S111, the web browser 304, which has received the instruction from the User A in step S110, sends a request for registration in the print service 303, together with the registration information including the printing function of the image forming apparatus 101 usable according to authority of the User A, to the print control software 301.

In step S112, the print control software 301, which has received the request for registration in the print service 303 in step S111, requests the print relay server 102 to register the image forming apparatus 101 in the print service 103. As to step S112, details of processing of particularly the print control software 301 and the relay virtual printer management service 302 in the print relay server 102 will be described below with reference to FIG. 14. In step S113, the print relay server 102, which has received the request from the print control software 301 in step S112, registers information about the image forming apparatus 101, on which the printing function usable according to the authority of the User A has been reflected, in the print service 303. As to step S113, details of processing of particularly the relay virtual printer management service 302 and the relay virtual printer 312 in the print relay server 102, and the print service 303 will be described below with reference to FIG. 15.

In step S114, the print service 303, which has received a result of registering the information about the image forming apparatus 101 in the print service 303 in step S113, returns the registration result. In step S115, the print relay server 102 manages the result of the registration of the image forming apparatus 101. More specifically, the control unit 502 in the relay virtual printer management service 302 in the print relay server 102 acquires an SPID serving as information received the print service 303 for identifying the image forming apparatus 101 in the print service 303. Further, the control unit 502 causes the relay virtual printer management unit 505 to acquire a VPID for identifying the relay virtual printer 312 corresponding to the image forming apparatus 101. The control unit 502 then instructs the printer information management unit 503 to store the information about the image forming apparatus 101 registered in the print service 303. FIG. 11A illustrates an example of the information about the image forming apparatus 101 registered in the print service 303, which the printer information management unit 503 has stored.

In step S116, the control unit 502 returns a result of the registration of the image forming apparatus 101 in the print service 303, which has been received in step S114, to the print control software 301. In step S117, the print control software control unit 402 confirms whether the image forming apparatus 101 has been successfully registered in the print service 303 in step S116. The print control software control unit 402 stores and manages in the registration unit 403 the confirmation that the image forming apparatus 101 has already been registered in the print service 303. More specifically, the print control software control unit 402 manages a character string for identifying user's authority and confirmation whether the image forming apparatus 101 having the printing function usable according to user's authority has already been registered in the print service 303 in association with each other, as illustrated in FIG. 11B. In step S118, the display unit 401 in the print control software 301, which has received a result of the registration of the image forming apparatus 101 in the print service 303 in step S117, generates a UI screen, and displays the UI screen on the web browser 304.

In step S112, the print control software 301 requests the relay virtual printer management service 302 in the print relay server 102 to register the image forming apparatus 101 in the print service 303. FIG. 14 is a flowchart illustrating a flow of processing for requesting the relay virtual printer management service 302 to register the image forming apparatus 101.

In step S1201, the print control software control unit 402 in the print control software 301 extracts information for identifying authority from the authority information of the User A, which has been acquired in step S108. The information includes a character string for identifying the authority of the User A, for example, "AdminUser" and "GeneralUser", and more specifically a character string representing an authority group to which the User A belongs. The registration unit 403 in the print control software 301 then confirms whether the image forming apparatus 101 having the printing function usable according to the authority of the User A has been registered in the print service 303. As illustrated in FIG. 11B, the registration unit 403 manages the character string for identifying user's authority and the confirmation whether the image forming apparatus 101 having the printing function usable according to user's authority has already been registered in the print service 303 in association with each other. The registration unit 403 confirms whether the image forming apparatus 101 having the printing function usable according to the authority of the User A has been registered in the print service 303 from a management result of the image forming apparatus 101 that has already been registered in the print service 303.

In step S1202, the registration unit 403 confirms whether the image forming apparatus 101 having the printing function usable according to the authority of the User A is unregistered in the print service 303 in step S1201. If the registration unit 403 confirms that the image forming apparatus 101 is unregistered (YES in step S1202), the processing proceeds to step S1203. In step S1203, the print control software control unit 402 generates registration information for registering the image forming apparatus 101 having the printing function usable according to the authority of the User A in the print service 303. FIG. 10A illustrates an example of the registration information, as previously described. User information for accessing the relay virtual printer management service 302 may be input from the UI screen displayed by the display unit 401 in the print control software 301, or may be stored in association with the user in the print control software 301.

In step S1204, the registration unit 403 sends the registration information generated in step S1203 to the relay virtual printer management service 302, and requests the relay virtual printer management service 302 to register the image forming apparatus 101 having the printing function usable according to the authority of the User A in the print service 303. User information for accessing the print service 303 may be input from the UI screen displayed by the display unit 401 in the print control software 301, or may be stored in association with the user in the print control software 301 or the relay virtual printer management service 302. Further, the registration unit 403 sends information for identifying the print service 303 for registering the image forming apparatus 101, e.g., a name "PrintService A" of the print service 303, together with the registration information, to the relay virtual printer management service 302.

In step S1205, the control unit 502 in the relay virtual printer management service 302 analyzes, when the request reception unit 501 in the relay virtual printer management service 302 receives the registration information sent in step S1204, a content of the registration information. More specifically, the control unit 502 in the relay virtual printer management service 302 confirms whether all information required to register the image forming apparatus 101 are included in the print service 303. In step 51206, the control unit 502 confirms whether the registration information is successfully analyzed. If the control unit 502 confirms that the registration information has been successfully analyzed (YES in step S1205), the processing proceeds to step S113. In step S113, the control unit 502 ends pre-processing for registering the image forming apparatus 101 in the print service 303, and registers the image forming apparatus 101 in step S113.

If the print control software control unit 402 confirms that the image forming apparatus 101 has already been registered (NO in step S1202), the processing proceeds to step S1207. In step S1207, the print control software control unit 402 requests the relay virtual printer management service 302 to share the image forming apparatus 101, which has already been registered in the print service 303, with the User A via the registration unit 403. The user information for accessing the print service 303 may be input from the UI screen displayed by the display unit 401 in the print control software 301, or may be stored in the print control software 301 or the relay virtual printer management service 302 in association with the user.

The control unit 502, which has received the request, finishes performing the pre-processing for registering the image forming apparatus 101 in the print service 303, and registers the image forming apparatus 101 in step S113. If the registration information received by the control unit 502 is not successfully analyzed (NO in step S1206), the processing proceeds to step S1208. In step S1208, the print control software control unit 402 performs error processing, and ends the processing for requesting to register the image forming apparatus 101.

In steps S113 and S114, the relay virtual printer management service 302 in the print relay server 102, which has received the request from the print control software 301 in step S112, generates the relay virtual printer 312. The information about the image forming apparatus 101, on which the printing function usable according to the authority of the User A has been reflected, is registered in the print service 303.

FIG. 15 is a flowchart illustrating a flow of processing for registering the image forming apparatus 101 in the print service 303. In step S1301, the control unit 502 in the relay virtual printer management service 302 instructs the print service printer generation unit 504 to attempt login into the print service 303 using user information specific to the relay virtual printer management service 302. The user information specific to the relay virtual printer management service 302 means a user registered in the print service 303 used to only register the image forming apparatus 101 in the print service 303 and update the information, and is retained in the print service printer generation unit 504.

In step S1302, the printer information registration unit 701 in the print service 303 processes a login request from the relay virtual printer management service 302 in step S1301. The printer information registration unit 701 confirms whether the login can be performed using the user information specific to the relay virtual printer management service 302. In step S1303, the control unit 502, which has received a result of the login into the print service 303 in step S1302, confirms whether the login has been successfully performed. If the login has not been successfully performed (NO in step S1303), the processing proceeds to step S1315. In step S1315, the control unit 502 performs error processing, and ends the registration processing.

If the login has been successfully performed (YES in step S1303), the processing proceeds to step S1304. In step S1304, the control unit 502 determines whether the image forming apparatus 101 is newly registered in the print service 303 in step S1204. If the image forming apparatus 101 is not newly registered in the print service 303 (NO in step S1304), the processing proceeds to step S1312. In step S1312, the control unit 502 receives a request to share the image forming apparatus 101 that has already been registered in step S1207. If the image forming apparatus 101 is newly registered in the print service 303 (YES in step S1304), the processing proceeds to step S1305. In step S1305, the relay virtual printer management unit 505 in the relay virtual printer management service 302 uses information for identifying the print service 303 received in step S1204, to acquire a print communication module A' 601 for communicating with the print service 303 from the interface information management unit 506.

In step S1306, the relay virtual printer management unit 505 generates the relay virtual printer 312, and sets the print communication module A' 601 acquired instep S1305 in the relay virtual printer 312. A print communication module B 602 for communicating with the image forming apparatus 101 is set in the relay virtual printer 312. Thus, the relay virtual printer 312 waits for notification of a print job from the print service 303. In step S1307, the relay virtual printer management unit 505 confirms whether the relay virtual printer 312 is normally generated. If it is confirmed that the relay virtual printer 312 is normally generated (YES in step S1307), the processing proceeds to step S1308. In step S1308, the relay virtual printer management unit 505 issues a VPID serving as identification information for identifying the relay virtual printer 312, and notifies the control unit 502 of the VPID.

In step S1309, the control unit 502 instructs the print service printer generation unit 504 to register the image forming apparatus 101 using the user information specific to the relay virtual printer management service 302 when the image forming apparatus 101 is newly registered in the print service 303 in step S1304. Information about the image forming apparatus 101 used when the image forming apparatus 101 is registered in the print service 303 is the registration information of the image forming apparatus 101 having the printing function usable according to the authority of the User A, which has been generated by the print control software control unit 402 in step S1203.

In step S1310, the printer information registration unit 701, which has received the instruction from the relay virtual printer management service 302 in step S1309, stores the image forming apparatus 101 in association with the user specific to the relay virtual printer management service 302 based on the received registration information. In this case, the printer information registration unit 701 issues the SPID registered in the printer information storage unit 702 for identifying the image forming apparatus 101, and stores the issued SPID in association with the user. The printer information registration unit 701 returns the SPID for identifying the image forming apparatus 101 to the relay virtual printer management service 302 as a result of success in the registration.

In step S1311, the control unit 501, which has received a result of the registration of the image forming apparatus 101 in the print service 303 in step S1310, determines whether the registration has been successfully performed. If the registration has not been successfully performed (NO in step S1311), the processing proceeds to step S1315. In step S1315, the control unit 502 performs error processing, and ends the registration. If the image forming apparatus 101 has been successfully registered in the print service 303 (YES in step S1311), the processing proceeds to step S1312. In step S1312, the control unit 502 designates the SPID received from the print service 303 for identifying the image forming apparatus 101, and issues an instruction to share the image forming apparatus 101 with the User A. More specifically, the control unit 502 issues an instruction to share the image forming apparatus 101 registered in the print service 303 using the user information in the print service 303 input by the User A, which has been received by the control unit 502 in step S1312.

In step S1313, the printer information registration unit 701, which has received the instruction from the relay virtual printer management service 302 in step S1312, shares the registered image forming apparatus 101 with the User A using the user information in the received print service 303 input by the User A and the SPID. In step S1314, the control unit 502, which has received a result of the sharing of the image forming apparatus 101 registered in the print service 303 in step S1313, determines whether the sharing has been successfully performed. If the sharing has not been successfully performed (No in step S1314), the processing proceeds to step S1315. In step S1315, the control unit 502 performs error processing. If the processing for registering the image forming apparatus 101 in step S113 normally ends, the processing proceeds to step S115.

The image forming apparatus 101 having the printing function usable according to the authority of the User A is thus registered in the print service 303 so that the User A can designate only the usable printing function, to perform printing. Further, the relay virtual printer 312 corresponding to the image forming apparatus 101 is generated in the print relay server 102 so that a print job generated in the print service 303 can be reserved in the relay virtual printer 312.

The image forming apparatus 101 is registered once in the print service 303 using the user information specific to the relay virtual printer management service 302 so that the information about the image forming apparatus 101 can be automatically updated when the configuration of the image forming apparatus 101 is changed, for example. Further, the image forming apparatus 101, which is shared among a plurality of users, need not be registered in the print service 303 individually by the users. Therefore, the printing function may be updated only for the user specific to the relay virtual printer management service 302 when the configuration of the image forming apparatus 101 is changed. Thus, unnecessary processing in the image forming apparatus 101, the relay virtual printer management service 302, and the print service 303, and the information about the image forming apparatus 101 registered in the print service 303 without applying a network load can be updated.

In the content printing system according to the exemplary embodiment of the present invention, each of steps of processing for registering the bookmarklet 365 used when an instruction for reservation is issued in the web browser 304 will be specifically described.

As illustrated in FIG. 8A, the User A is required to register the bookmarklet 365 in the web browser 304 to retain the content 362 displayed on the web browser 304 as a print job to be reserved in the print relay server 102. FIG. 16 is a flowchart illustrating a flow of processing for registering the bookmarklet 365 used when the User A instructs the print relay server 102 to reserve the print job in the web browser 304.

In step S201, the web browser 304 sends, when the User A starts the web browser 304, and issues an instruction to access the print relay service 302 by inputting the URL, for example, a request of the UI screen to the relay virtual printer management service 302 in the print relay server 102.

In step S202, the request reception unit 501 in the relay virtual printer management service 302, which has received the request of the UI screen from the web browser 304 in step S201, notifies the control unit 502 of the request. The control unit 502 causes the interface information management unit 506 to collect a list of cooperative print services 303 and a bookmarklet for reserving a print job received from the print service 303 in the relay virtual printer 312.

FIG. 9B illustrates an example of a script constituting the bookmarklet 365 illustrated in FIG. 8A. The bookmarklet 365 includes a script 390 that can be interpreted by the web browser 304, for example, Javascript. The reservation instruction sending script 391 corresponding to the print relay server 102 is a substance of the script 390, and indicates that a URI "location.href" of the content 362 displayed on the web browser 304 is sent to a URI "http://www.abc.com/defgh/QueuePrintJob.aspx" of the print relay server 102. More specifically, the web browser 304 sends the content URI 363 "http://www.xxxx.com/Doc?docid=abcdef0123456" to the relay virtual printer management service 302 in the print relay server 102. When the relay virtual printer 312 receives the print job in the print service 303, therefore, a URI of a content to be printed as information about the print job can be retained in the relay virtual printer 312 as a print job to be reserved if it is the same as the content URI 363 sent by the bookmarklet 365.

While the bookmarklet 365 for sending the content URI 363 displayed on the web browser 304 to the print relay server 102 has been described in the present exemplary embodiment, functions other than the bookmarklet 365 may be used. If the information about the print job in the print service 303 includes a name of the content to be printed, for example, there may be a bookmarklet for acquiring the name of the content to be printed and sending the name to the relay virtual printer management service 302. As a configuration for flexibly coping with a plurality of different print services 303, processing for acquiring property information corresponding to a content maybe further performed in the print relay server 102 that has received the content URI 363. More specifically, information to be sent by the bookmarklet may be any information as long as it can identify the content, or may be any information if it can be compared with information about the job acquired by the print relay server 102. The information includes a job ID or a document ID. The information may not necessarily be information that completely matches the information to be sent but information used for identifying the information to be sent. Thus, information used to identify the content is referred to as content identification information.

In step S203, the relay virtual printer management service 302 generates a UI to be returned to the web browser 304 using the list of print services 303 and the bookmarklet 365, which have been collected by the control unit 502 in step S202. FIG. 9A illustrates an example of a UI screen displayed when the user accesses the relay virtual printer management service 302 via the web browser 304. The UI screen includes a print relay server menu list 381 for displaying a list of setting menus in the print relay server 102 and a print relay server cooperation display area 382 for displaying a list of print services 303 that can cooperate with one another in the print relay server 102. Further, the print relay cooperation display area 382 includes a print service cooperation script 383 in which a bookmarklet for issuing an instruction to reserve the print job in the print service 303 after receiving the print job in the print relay server 102 is embedded. As to the screen illustrated in FIG. 9, its form, area configuration, and control are not limited. Any form may be used if it can implement a required function.

In step S204, the web browser 304 receives and displays the UI, which has been generated by the relay virtual printer management service 302 in step S203. In step S205, the web browser 304 operates for the User A to select the print service cooperation script 383 displayed on the web browser 304 and register the selected print service cooperation script 393 in the bookmark. In step S206, the web browser 304 registers the bookmarklet 356 for issuing an instruction to reserve the print job in the print service 303 in the bookmark list 364 in the web browser 304, as illustrated in FIG. 8A.

In the content printing system according to the exemplary embodiment of the invention, steps of processing for the User A to print a content stored in the web application 305 in the image forming apparatus 101 via the web browser 304 will be specifically described.

When the User A accesses the web application 305 via the web browser 304, and issues an instruction to print the displayed content, the relay virtual printer 312 in the print relay server 102 acquires the print job from the print service 303. The User A can reserve the print job acquired from the print service 303 in the relay virtual printer 312.

FIG. 17 is a sequence diagram illustrating an outline of a flow of processing for the relay virtual printer 312 to acquire a print job from the print service 303 after the User A issues an instruction to perform printing. In step S301, the User A starts the web browser 304, accesses the web application 302 by inputting a URL, for example, and issues an instruction to display a target content. In step S302, the web browser 304, which has received the instruction from the User A in step S301, requests the web application 305 to display the content.

In step S303, the web application 305, which has received the request of the content from the web browser 304 in step S302, sends a screen of a content corresponding to the requested content to the web browser 304. FIG. 8A illustrates an example of a screen of the document generation service provided by the web application 305, as described above. In step S304, the User A selects the bookmarklet 365 when it desires to reserve a print job corresponding to the content 362 retained by the web application 305 displayed in step S303 in the relay virtual printer 312.

In step S305, the web browser 304, which has received the instruction from the User A in step S304, executes the script in the bookmarklet 365, and instructs the relay virtual printer management service 302 to reserve the print job corresponding to the content 362 in the relay virtual printer 312. In this case, the web browser 304 sends the content URL 363 for identifying the content 362 displayed on the web browser 304. In step S306, the relay virtual printer management service 302, which has received the instruction to reserve the print job in step S305, instructs the relay virtual printer 312 to reserve the print job corresponding to the content 362. A detailed flow of the step will be described below with reference to FIG. 18.

In step S307, the relay virtual printer management service 302, which has received the instruction to reserve the print job in step S306, sends a result of determination whether the relay virtual printer 312 is ready to reserve the print job to the web browser 304. In step S308, the User A selects the print button 361 to print the content 362, retained in the web application 305, displayed in step S303. In step S309, the web browser 304, which has received the instruction from the User A in step S308, requests an image forming apparatus (printer) list UI registered in the print service 303. In step S310, the print service 303, which has received the request of the printer list UI in step S309, sends the printer list UI corresponding to the User A, who uses the web browser 304, to the web browser 304.

In step S311, the User A selects the printer that desires to print the content 362 for the printer list UI displayed on the web browser 304 in step S310. In step S312, the web browser 304 requests, when the User A selects the printer in step S311, a print setting UI corresponding to the selected printer. In step S313, the print service 303, which has received the request of the print setting UI corresponding to the printer in step S312, sends the print setting UI corresponding to the printer selected by the User A to the web browser 304. In step S314, the User A selects the print setting and issues an instruction to perform printing for the print setting UI corresponding to the printer displayed on the web browser 304 in step S313.

In step S315, the web browser 304, which has received the instruction to perform printing from the User A in step S314, sends the print setting selected by the User A to the print service 303. In step S316, the print service 303, which has received the instruction to perform printing in step S315, acquires the content 362, which the User A issues an instruction to print, from the web application 305, and converts the acquired content 362 into print data based on the received print setting. The print service 303 uses the print data obtained by the conversion and the print setting as a combination of jobs. In step S317, the print service 303, which has generated the print job in step S316, notifies the relay virtual printer 312 that the print job has been generated.

In step S318, the relay virtual printer 312, which has been notified of the print job in step S317, determines whether the print job is a print job to be reserved, which the relay virtual printer management service 302 instructs the relay virtual printer 312 to reserve in step S306. Details of step S306 will be described below with reference to FIG. 18. In step S306, the relay virtual printer management service 302 notifies the relay virtual printer 312 of the content URI 363 for identifying the content 362 as information for determining the print job to be reserved. The print job management unit 605 in the relay virtual printer 312 retains information about the content 362.

The print job notification unit 604 in the relay virtual printer 312, which has been notified that the print notification reception unit 603 has received the print job from the print service 303, confirms whether the print job includes the content URI 363 for identifying the content 362, i.e., content identification information. The print job notification unit 604, which has confirmed that the print job includes the information about the content 362, determines the content identification information and content identification information notified from a client match each other. If the content identification information match each other, it is determined that the print job is a print job to be reserved in the print relay server 102, and is stored and reserved in the print job management unit 605. A print job, which is not reserved in the print relay server 102, may be notified to the image forming apparatus 101 or acquired, and may be automatically output in the image forming apparatus 101. The notification is to send information about a storage location (a URL of a storage location) of print data stored in the memory of the print server group 103 to the image forming apparatus 101. The acquisition is to receive print data from the print server group 1093 and send the received print data to the image forming apparatus 101 without reserving the print data in the print relay server 102.

While this flow has been described on the premise that the print data is reserved, similar processing to the processing of the print job that is not reserved is performed even when an instruction to reserve the print data is not received. More specifically, the print data is sent to the image forming apparatus 101 in response to receipt of the print data form a print server. Alternatively, the print data is sent to the image forming apparatus 101 in response to receipt of the information about the storage location of the print data stored in a storage unit of the print server from the print server.

In step S306, the relay virtual printer management service 302, which has received the instruction to reserve the print job according to the instruction from the User A in step S305, instructs the relay virtual printer 312 to reserve the print job corresponding to the content 362. FIG. 18 is a flowchart illustrating a flow of processing for the relay virtual printer management service 302 to perform setting to reserve the print job corresponding to the content 362 to be reserved.

In step S3101, the relay virtual printer management service 302 extracts information about the content 362 included in the instruction to reserve the print job sent in step S305. More specifically, the request reception unit 501 in the relay virtual printer management service 302 notifies, when it receives the sent instruction to reserve the print job selected by the User A and sent by executing the script in the bookmarklet 365, the control unit 502 of the reservation instruction. The control unit 502, which has been notified, extracts the content URI 363 for identifying the content 362 from the request to reserve the print job.

In step S3102, the control unit 502 instructs the print service printer generation unit 504 to acquire a list of image forming apparatuses 101 (printers) registered in the print service 303 by the User A. The print service printer generation unit 504, which has received the instruction, sends a request to acquire the list of printers registered in the print service 303 by the User A to the print service 303. In this case, the User A may input user information for the print service printer generation unit 504 to access the print service 303 via the web browser 304 in an authentication system such as OAuth. Alternatively, the User A may retain user information for accessing the print service 303 in the relay virtual printer management service 302.

In step S3103, the printer information registration unit 701 in the print service 303, which has received the request to acquire the list of printers registered by the User A in step S3102, instructs the printer information storage unit 702 to search the list of printers associated with the User A. The printer information storage unit 702 searches the list of printers associated with the User A from the user registered in the print service 303 illustrated in FIG. 12A and the information about the image forming apparatus 101 (printer) usable by the user. The printer information registration unit 701 returns a list of SPIDs for identifying the printer to the print service printer generation unit 504 in the relay virtual printer management service 302 as the list of printers associated with the User A by the printer information storage unit 702.

In step S3104, the print service printer generation unit 504 notifies the control unit 502 of information about the list of printers, which is registered in the print service 303 by the User A, acquired in step S3103. The control unit 502 confirms whether the number of printers registered in the print service 303 by the User A is one or more. If the printer registered in the print service 303 by the User A does not exist (NO in step S3104), the processing proceeds to step S3109 because a reservation instruction from the User A is not normally received. In step S3109, the control unit 502 performs error processing, and ends the flow.

If the number of printers registered in the print service 303 by the User A is one or more (YES in step S3104), the processing proceeds to step S3105. In step S3105, the control unit 502 acquires a VPID for identifying the relay virtual printer 312 from the acquired SPID. More specifically, the control unit 502 acquires a VPID corresponding to the SPID from the information about the image forming apparatus 101 registered in the print service 303, which is retained by the printer information management unit 503.

In step S3106, the control unit 502 instructs the relay virtual printer 312 corresponding to the VPID acquired in step S3105 to reserve the print job corresponding to the content 362 via the relay virtual printer generation unit 505. In this case, the control unit 502 notifies the relay virtual printer 312 of the content URI 363 extracted in step S3101 as information for identifying the content 352.

In step S3107, the print job management unit 605 in the relay virtual printer 312 retains the information for identifying the content 362, which has been notified in step S3106, and reserves the print job having the information for identifying the content 362, which has been received from the print service 303. Thus, the relay virtual printer 312 reserves and stores, out of print jobs sent from the print relay service 303, the plurality of print jobs to be reserved.

In step S3108, the control unit 502 confirms whether all the relay virtual printers 312 registered by the User A, which have been received in step S1304, have been notified of the instruction to reserve the print job and the information about the content 362 to be reserved. If all the relay virtual printers 312 have not been notified of the instruction to reserve the print job and the information about the content 362 to be reserved (NO in step S3108), the processing returns to step S3105. If the all the relay virtual printers 312 have been notified (YES in step S3108), the processing for reservation setting of the print job ends. Thus, a print job corresponding to a target content can be reserved in the print relay server 102 without newly registering the image forming apparatus 101 in the print service 303.

The User A accesses the print relay server 102 via the image forming apparatus 101, acquires the print job reserved in the print relay server 102, and outputs the acquired print job to the image forming apparatus 101. FIG. 19 is a sequence diagram illustrating a flow of processing for the User A to operate the image forming apparatus 101 and output the print job reserved in the relay virtual printer 312.

In step S401, the User A logs into the print control software 301 via an operation panel (not illustrated) in the image forming apparatus 101. In step S402, the print control software 301 requests the information about the relay virtual printer 312 from the relay virtual printer management service 302 to display the print job designated by the User A reserved in the print relay server 102 on the operation panel of the image forming apparatus 101. More specifically, the registration unit 403 in the print control software 301 sends an ID for identifying the image forming apparatus 101 in response of receiving of the instruction from the print control software control unit 402, and requests the information about the relay virtual printer 312 from the relay virtual printer management service 302. The user information for accessing the relay virtual printer management service 302 may be input from the UI screen displayed by the display unit 401 in the print control software 301, or may be stored in association with the user in the print control software 301.

In step S403, the request reception unit 501 in the relay virtual printer management service 302, which has received the request from the print control software 301 in step S402, notifies the control unit 502 of the request. The control unit 502 then acquires a VPID stored in the printer information management unit 503 for identifying the relay virtual printer 312 corresponding to the image forming apparatus 101. More specifically, the control unit 502 acquires the VPID corresponding to the ID for identifying the image forming apparatus 101 retained by the printer information management unit 503, as illustrated in FIG. 11A, described above.

In step S404, the control unit 502 sends the VPID for identifying the relay virtual printer 312 corresponding to the image forming apparatus 101 in step S403 to the print control software 301 via the request reception unit 501. In step S405, the print notification reception unit 404 in the print control software 301 requests the list of print jobs from the relay virtual printer 312 using the VPID received in step S404.

In step S406, the print job notification unit 604 in the relay virtual printer 312, which has received the request from the print control software 301 in step S405, sends the list of print jobs designated by the User A, which is reserved and stored in the print job management unit 605. The print control software control unit 402 displays the acquired list of print jobs on the operation panel of the image forming apparatus 101 via the display unit 401. FIG. 20 illustrates an example of a print job 800 to be sent to the print control software control unit 402 by the relay virtual printer 312, where an XML represents a content of the print job 800. The print job 800 includes a job ID 810 for identifying the print job 800, a name of the content 362 to be printed, a state 812 of the print job 800, a storage location 813 of print data included in the print job 800, and a storage location 814 of a print setting in the print job 800. A unit representing the print job 800 is not limited to this. The unit may be another description unit such as JavaScript Object Notation (JSON). Alternatively, information included in the print job 800 may be other information such as user information in which a print job is input.

The print job acquired from the relay virtual printer 312 includes a storage location of a print setting and a storage location of print data. In step S407, the User A selects a print job displayed on the operation panel of the image forming apparatus 101, and issues an instruction to perform printing. In step S408, the print notification reception unit 404 in the print control software 301 confirms, when the User A designates the print job and issues the instruction to perform printing, the designated print job, and notifies information to the print setting acquisition unit 405 and the print data acquisition unit 406, respectively. More specifically, the print notification reception unit 404 notifies the storage location 814 of the print setting included in the print job 800 and the storage location 813 of the print data, respectively, to the print setting acquisition unit 405 and the print data acquisition unit 406.

In step S409, the print setting acquisition unit 405, which has been notified of the storage location 814 of the print setting in step S408, accesses the URI described in the storage location 814 of the print setting, and sends a request to acquire the print setting to the print service 303. In step S410, the print setting storage unit 709 in the print service 303, which has received the request from the print setting acquisition unit 405 in step S409, sends the print setting in the print job to the print setting acquisition unit 405. In step S411, the print data acquisition unit 406, which has been notified of the storage location 813 of the print data included in the print job in step S408, accesses the URI described in the storage location 813 of the print data, and sends a request to acquire the print setting corresponding to the print job to the print service 303.

In step S412, the print data storage unit 708 in the print service 303, which has received the request from the print setting acquisition unit 405 in step S411, sends the print data included in the print job to the print data acquisition unit 406. In step S413, the print notification acquisition unit 404, which has confirmed that the print setting and the print data included in the print job in steps S410 and S412, instructs the print execution unit 408 to perform printing. More specifically, the print notification reception unit 404 instructs the printing unit to generate a raster image based on the print setting and print data and print the generated raster image. Thus, the image forming apparatus 101 can reduce data traffic and a processing load of the relay virtual printer 312 by directly acquiring the print setting and the print data corresponding to the print job from the print service 303. Further, the frequency of passage of the print data through a network is reduced so that a processing performance can be improved.

In the present exemplary embodiment, a configuration in which the image forming apparatus 101 directly acquires the print setting corresponding to the print job and the print data from the print service 303 has been described. However, the image forming apparatus 101 may acquire a print setting and print data from the relay virtual printer 312. For example, the relay virtual printer 312 can acquire the print setting and the print data from the print service 303, then perform processing such as conversion of the print setting and the print data into data formats that can be handled by the image forming apparatus 101, respectively, and then transfer the print data to the image forming apparatus 101.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading and executing a program recorded on a memory device to perform the functions of the above-described embodiment(s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-040325 filed Feb. 25, 2011, which is hereby incorporated by reference herein in its entirety.

What is claimed is:
1. A print relay server comprising:
a reception unit configured to receive, from a client apparatus configured to display a screen for editing a content using a web application service of a web application server, an instruction to reserve print data corresponding to the content edited on the screen; and a relay virtual printer configured to receive, when an image forming apparatus prints print data obtained by converting the content, the print data from a print server that has converted the content into the print data and store the received print data as print data to be reserved in a storage unit of the print server when the reception unit receives the instruction to reserve the print data, and configured to receive the print data from the print server and send the received print data to the image forming apparatus without reserving the print data, or to receive information about a storage location of the print data stored in the storage unit of the print server from the print server and send the received information about the storage location to the image forming apparatus when the reception unit does not receive the instruction to reserve the print data.

2. The print relay server according to claim 1, wherein a script is executed in the client by issuing the instruction to reserve the print data, and content identification information for identifying the content sent by executing the script is included in the instruction to reserve the print data.

3. The print relay server according to claim 2, further comprising an extraction unit configured to extract the content identification information from the instruction to reserve the print data, wherein the relay virtual printer receives, when the content identification information extracted by the extraction unit and the content identification information received together with the print data received from the print server match each other, the print data from the print server, and stores the received print data as print data to be reserved in the storage unit, and sends, when the content identification information extracted by the extraction unit and the content identification information received together with the print data received from the print server do not match each other, the print data to the image forming apparatus without storing the print data as print data to be reserved in the storage unit, or sends the information about the storage location of the print data stored in the storage unit of the print server to the image forming apparatus in response to receipt of the information about the storage location from the print server.

4. The print relay server according to claim 1, wherein the image forming apparatus includes a plurality of image forming apparatuses, and the relay virtual printer has a one-to-one correspondence with one of the plurality of image forming apparatuses, and sends the print data received from the print server or the information about the storage location to the corresponding image forming apparatus.

5. The print relay server according to claim 1, further comprising:

an acquisition unit configured to acquire a list of printers registered in association with a user who has issued an instruction to reserve the print data from the print server that manages the list of printers; and an instruction unit configured to instruct, when the reception unit receives the instruction to reserve the print data, the relay virtual printer associated with each of printers included in the list of printers, which has been acquired by the acquisition unit, to reserve the print data serving as a reservation print target.

6. A method for controlling a print relay server, the method comprising:

receiving, via a reception unit, from a client apparatus configured to display a screen for editing a content using a web application service of a web application server, an instruction to reserve print data corresponding to the content edited on the screen;

receiving, via a relay virtual printer, when an image forming apparatus prints print data obtained by converting the content, the print data from a print server that has converted the content into the print data and storing the received print data as a reservation print target in a storage unit when the reception unit receives the instruction to reserve the print data, and receiving the print data from the print server and sending the received print data to the image forming apparatus without reserving the print data, or receiving information about a storage location of the print data stored in the storage unit of the print server from the print server and sending the received information about the storage location to the image forming apparatus when the reception unit does not receive the instruction to reserve the print data.

7. The method according to claim 6, wherein a script is executed in the client by issuing the instruction to reserve the print data, and content identification information for identifying the content sent by executing the script is included in the instruction to reserve the print data.

8. The method according to claim 7, further comprising:

extracting, via an extraction unit, the content identification information from the instruction to reserve the print data;

receiving, via the relay virtual printer, when the content identification information extracted by the extraction unit and the content identification information received together with the print data received from the print server match each other, the print data from the print server, and storing the received print data as print data to be reserved in the storage unit; and sending, via the relay virtual printer, when the content identification information extracted by the extraction unit and the content identification information received together with the print data received from the print server do not match each other, the print data to the image forming apparatus without storing the print data as print data to be reserved in the storage unit, or sending the information about the storage location of the print data stored in the storage unit of the print server to the image forming apparatus in response to receipt of the information about the storage location from the print server.

9. The method according to claim 6, wherein the image forming apparatus includes a plurality of image forming apparatuses, and the relay virtual printer has a one-to-one correspondence with one of the plurality of image forming apparatuses, and sends the print data received from the print server or the information about the storage location to the corresponding image forming apparatus.

10. The method according to claim 6, further comprising:

acquiring, via an acquisition unit, a list of printers registered in association with a user who has issued an instruction to reserve the print data from the print server that manages the list of printers; and instructing, via an instruction unit, when the reception unit receives the instruction to reserve the print data, the relay virtual printer associated with each of printers included in the list of printers, which has been acquired by the acquisition unit, to reserve the print data serving as a reservation print target.

11. A non-transitory computer-readable storage medium storing a program for causing a computer to perform the method according to claim 6.

* * * * *